(12) United States Patent
Gonia et al.

(10) Patent No.: US 12,007,130 B2
(45) Date of Patent: Jun. 11, 2024

(54) DAMPER SYSTEM CONTROL MODULE

(71) Applicant: Ademco Inc., Golden Valley, MN (US)

(72) Inventors: Patrick Gonia, Maplewood, MN (US); David J. Emmons, Coon Rapids, MN (US); Nathan Carlson, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 17/533,446

(22) Filed: Nov. 23, 2021

(65) Prior Publication Data
US 2022/0146135 A1    May 12, 2022

Related U.S. Application Data

(62) Division of application No. 16/006,568, filed on Jun. 12, 2018, now Pat. No. 11,209,180.

(51) Int. Cl.
*F24F 11/00* (2018.01)
*F24F 11/56* (2018.01)
(Continued)

(52) U.S. Cl.
CPC .......... *F24F 11/0001* (2013.01); *F24F 11/56* (2018.01); *F24F 11/74* (2018.01); *F24F 11/88* (2018.01)

(58) Field of Classification Search
CPC ........ F24F 11/0001; F24F 11/56; F24F 11/74; F24F 11/88; F24F 13/10; F24F 13/1426;
(Continued)

(56) References Cited

U.S. PATENT DOCUMENTS 2,844,086 A    7/1958   Birdsall
4,482,291 A    11/1984  Chakrawarti et al.
(Continued)

FOREIGN PATENT DOCUMENTS

CN    106369788 A    2/2017
GB       565714 A    11/1944

OTHER PUBLICATIONS

"Dynamic Airflow Balancing (DAB): Save Energy and Provide Comfort," 75F, 15 pages, updated Feb. 9, 2018.
(Continued)

*Primary Examiner* — Thomas C Lee
*Assistant Examiner* — Michael Tang
(74) *Attorney, Agent, or Firm* — Greenberg Traurig, LLP; Ryan D. Sharp; David J. Dykeman

(57) ABSTRACT

A control module configured to control operation of a damper assembly includes an air damper configured to be disposed within an air duct and movable between an open end position and a closed end position, the air duct providing conditioned air to a register boot proximate the air duct. The control module includes a control module housing that is securable to the register boot. A controller is disposed within the control module housing and is configured to generate damper position control signals, the controller providing the damper position control signals to the damper assembly via a control cable that operably couples the control module with the damper assembly. An antenna extends from the control module housing and is operably coupled to the controller, and is configured to extend through an opening formed within a wall of the register boot to be positioned exterior to the register boot.

18 Claims, 37 Drawing Sheets

(51) Int. Cl.
*F24F 11/74* (2018.01)
*F24F 11/88* (2018.01)

(58) Field of Classification Search
CPC ........... F24F 2013/1473; F24F 2110/10; F24F 2110/20; F24F 11/32; F24F 11/58; F24F 2110/50; Y02B 30/70
USPC ........ 700/276; 236/49.3; 454/258, 330, 256, 454/333; 165/208
See application file for complete search history.

(56) References Cited

U.S. PATENT DOCUMENTS

| | | | |
|---|---|---|---|
| 4,949,625 | A | 8/1990 | Miklos |
| 5,668,699 | A * | 9/1997 | Bell ..................... H05K 1/0215 361/752 |
| 5,896,959 | A | 4/1999 | Jeffries et al. |
| 6,217,441 | B1 * | 4/2001 | Pearman ................. F24F 11/32 454/902 |
| 6,327,368 | B1 | 12/2001 | Yamaguchi et al. |
| 6,817,378 | B2 | 11/2004 | Zelczer |
| 7,455,236 | B2 | 11/2008 | Kates |
| 7,455,237 | B2 | 11/2008 | Kates |
| 7,543,759 | B2 | 6/2009 | George |
| 7,566,264 | B2 | 7/2009 | Votaw et al. |
| 7,663,844 | B2 | 2/2010 | Song et al. |
| 7,789,317 | B2 | 9/2010 | Votaw et al. |
| 8,033,479 | B2 | 10/2011 | Kates |
| 8,059,060 | B2 * | 11/2011 | Barter .................. H01Q 1/1214 343/878 |
| 8,457,796 | B2 | 6/2013 | Thind |
| 8,695,888 | B2 | 4/2014 | Kates |
| 8,951,103 | B2 | 2/2015 | Votaw et al. |
| 8,956,207 | B2 | 2/2015 | Jackson |
| 9,091,280 | B2 | 7/2015 | Hopkins |
| 9,182,140 | B2 | 11/2015 | Kates |
| 9,194,599 | B2 | 11/2015 | Kates |
| 9,194,600 | B2 | 11/2015 | Kates |
| 9,222,692 | B2 | 12/2015 | Kates |
| 9,273,879 | B2 | 3/2016 | Kates |
| 9,303,889 | B2 | 4/2016 | Kates |
| 9,303,890 | B2 | 4/2016 | Haines et al. |
| 9,311,909 | B2 | 4/2016 | Giaimo, III et al. |
| 9,316,407 | B2 | 4/2016 | Kates |
| 9,353,963 | B2 | 5/2016 | Kates |
| 9,353,964 | B2 | 5/2016 | Kates |
| 9,618,222 | B1 | 4/2017 | Hussain et al. |
| 9,723,380 | B2 | 8/2017 | Patel et al. |
| 9,854,335 | B2 | 12/2017 | Patel et al. |
| 10,158,190 | B1 | 12/2018 | Sun et al. |
| 2002/0179159 | A1 | 12/2002 | Zelczer |
| 2005/0026499 | A1 * | 2/2005 | Choi .................. H01R 13/2421 439/607.01 |
| 2006/0105697 | A1 * | 5/2006 | Aronstam ................ F24F 11/74 454/256 |
| 2007/0054697 | A1 | 3/2007 | Money et al. |
| 2008/0139048 | A1 | 6/2008 | Tai et al. |
| 2008/0314260 | A1 | 12/2008 | Hardenburger |
| 2009/0040127 | A1 | 2/2009 | Williams |
| 2009/0065595 | A1 | 3/2009 | Kates |
| 2010/0012737 | A1 | 1/2010 | Kates |
| 2010/0105312 | A1 | 4/2010 | Bamberger |
| 2010/0163633 | A1 | 7/2010 | Barrett et al. |
| 2010/0225547 | A1 * | 9/2010 | Lan ..................... H01Q 1/3283 343/861 |
| 2011/0198404 | A1 | 8/2011 | Dropmann |
| 2013/0021146 | A1 | 1/2013 | Stegmaier et al. |
| 2014/0053586 | A1 | 2/2014 | Poecher et al. |
| 2014/0217097 | A1 | 8/2014 | Maeda |
| 2014/0361933 | A1 * | 12/2014 | Zhang .................... H01Q 1/243 343/702 |
| 2015/0159908 | A1 | 6/2015 | Votaw et al. |
| 2015/0300671 | A1 | 10/2015 | Coleman et al. |
| 2015/0369507 | A1 | 12/2015 | Flaherty et al. |
| 2016/0091220 | A1 | 3/2016 | Kates |
| 2016/0153674 | A1 | 6/2016 | Lancaster |
| 2016/0291615 | A1 | 10/2016 | Zakaria |
| 2016/0333884 | A1 | 11/2016 | Hussain et al. |
| 2017/0089599 | A1 | 3/2017 | Hale |
| 2017/0176034 | A1 | 6/2017 | Hussain et al. |
| 2017/0322268 | A1 | 11/2017 | Van Helvoort et al. |
| 2018/0087799 | A1 * | 3/2018 | Pridemore .............. F24F 12/00 |
| 2018/0094828 | A1 | 4/2018 | Komiya et al. |
| 2018/0294557 | A1 | 10/2018 | Lu et al. |
| 2019/0009097 | A1 | 1/2019 | Hartley et al. |
| 2019/0154298 | A1 * | 5/2019 | Zelczer ................... F24F 13/10 |
| 2019/0376704 | A1 | 12/2019 | Gonia et al. |

OTHER PUBLICATIONS

"Smart VAV with Reheat: A unique system-wide approach to maximizing performance," 75F, 12 pages, updated Feb. 9, 2018.
Singh, "9 Considerations When Employing IOT," 75F, 6 pages, retrieved 2018. (Applicant points out, in accordance with MPEP 609.04(a), that the year of publication, 2018, is sufficiently earlier than the effective U.S. filing date, so that the particular month of publication is not in issue.).
Singh, "The Internet of Comfort," 75F, 6 pages, retrieved 2018. (Applicant points out, in accordance with MPEP 609.04(a), that the year of publication, 2018, is sufficiently earlier than the effective U.S. filing date, so that the particular month of publication is not in issue.).
Singh, "The EMS Is Dead," 75F, 4 pages, retrieved 2018. (Applicant points out, in accordance with MPEP 609.04(a), that the year of publication, 2018, is sufficiently earlier than the effective U.S. filing date, so that the particular month of publication is not in issue.).
"Technology Brief," 75F, 4 pages, retrieved 2018. (Applicant points out, in accordance with MPEP 609.04(a), that the year of publication, 2018, is sufficiently earlier than the effective U.S. filing date, so that the particular month of publication is not in issue.).
"Technology Brief," 5 pages, retrieved 2018. (Applicant points out, in accordance with MPEP 609.04(a), that the year of publication, 2018, is sufficiently earlier than the effective U.S. filing date, so that the particular month of publication is not in issue.).
Murthy et al., "Active Noise Control of a Radial Fan," Blekinge Institute of Technology, 66 pages, Dec. 2008.
"Back-EMF Motion Feedback Blog Post," Acroname, 7 pages, Apr. 17, 2011.
"Dampers," Arzel Zoning, 7 pages, retrieved Apr. 6, 2018.
"Under Pressure: Why Dynamic Monitoring Is Essential To Residential HVAC Zoning and Vent Control," Ecovent Corp, 14 pages, Mar. 2014.
"Specification Sheet," Aprilaire, 2 pages, Jun. 2005.
"Smart Vent," Google Image Search, 16 pages, retrieved Apr. 6, 2018.
"Flair for Central Heating and Cooling," Flair, 7 pages, retrieved Apr. 6, 2018.
Prosecution History from U.S. Appl. No. 16/006,568, dated Jun. 25, 2020 through Aug. 27, 2021, 60 pp.

* cited by examiner

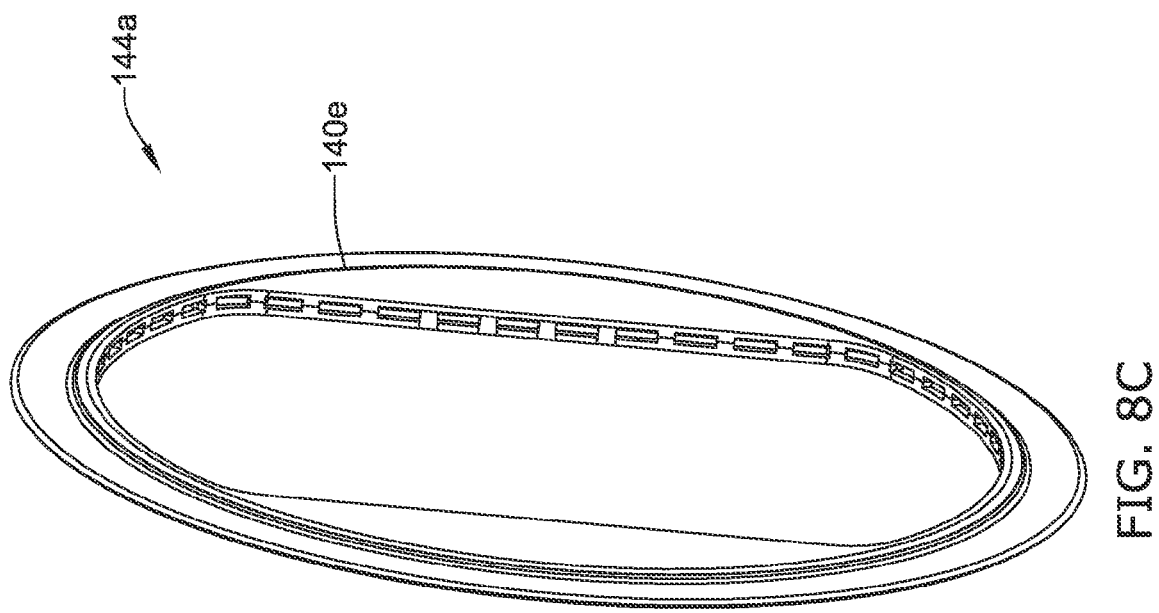

DAMPER SYSTEM CONTROL MODULE

This application is a divisional of U.S. patent application Ser. No. 16/006,568, which was filed on Jun. 12, 2018, and is entitled, "DAMPER SYSTEM CONTROL MODULE WITH RADIO CONTROLLER ANTENNA FOR INSTALLATION," the entire content of which is incorporated herein by reference.

TECHNICAL FIELD

The present disclosure pertains to a Heating, Ventilation, and/or Air Conditioning (HVAC) system for a building. More particularly, the present disclosure pertains to devices for adding zoning to an existing HVAC system.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted within the building and provides control signals to various HVAC components of the HVAC system. In some buildings, there may be a desire to add zoning to the HVAC system in order to better control one or more environmental conditions within the building. Zoning can provide the ability to control environmental conditions within a particular area or region of a building. Improvements in the hardware, user experience, and functionality of such HVAC systems, including the ability to retrofit zoning to an existing HVAC system, would be desirable.

SUMMARY

The disclosure relates generally to devices for retrofitting an existing HVAC system with zoning. In some cases, these devices may also be used for zoning in new constructions, but are particularly designed for use in adding zoning to an existing HVAC system. In some cases, the disclosure relates to a control module that is configured to control operation of a damper assembly that includes an air damper configured to be disposed within an air duct and movable between an open end position and a closed end position, the air duct providing conditioned air to a register boot proximate the air duct. The control module includes a control module housing that is configured to be secured to the register boot. A controller is disposed within the control module housing and is configured to generate damper position control signals, the controller providing the damper position control signals to the damper assembly via a control cable that operably couples the control module with the damper assembly. An antenna extends from the control module housing and is operably coupled to the controller. In some cases, the antenna may be configured to extend through an opening formed within a wall of the register boot to be positioned exterior to the register boot.

Another example of the disclosure is a control module that is configured to control operation of a damper assembly, the damper assembly including an air damper configured to be disposed within an air duct. The control module includes a control module housing configured to be secured within a register boot downstream of the air duct and a control jack for receiving a control cable that operably couples the control module with the damper assembly. A control circuit board is disposed within the control module housing and is operably coupled with the control jack. The control circuit board includes a transceiver for receiving instructions communicated from a remote building controller and a processor for generating air damper movement commands in response to the received instructions, the air damper movement commands being sent to the damper assembly via the control cable that operably couples the control module with the damper assembly. An antenna extends from the control module housing and is operably coupled to the transceiver, at least part of the antenna being configured to extend through an opening formed within a wall of the register boot to be positioned exterior to the register boot.

Another example of the disclosure is a damper system that is configured for installation in ductwork including a duct supplying conditioned air through a metal register boot to a register vent. The damper system includes a damper assembly that is configured to be disposed within the duct, the damper assembly including a damper that is movable between a closed end position in which air moving through the duct is at least substantially blocked from flowing past the damper assembly and an open end position in which the air moving through the duct is permitted to flow past the damper assembly and through the metal register boot and the register vent. A control module is configured to be operably coupled to the damper assembly and includes a control module housing and a circuit board disposed within the control module housing that regulates operation of the damper assembly, the control module housing configured to be secured remote from the damper assembly at a position downstream of the damper assembly and upstream of the register vent. An antenna is electrically coupled with the circuit board of the control module with at least part of the antenna being configured to extend through an opening formed within a wall of the metal register boot to be positioned exterior to the metal register boot.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 8C is a side perspective view of a portion of the illustrative damper assembly of FIG. 8A;

Figure 1:
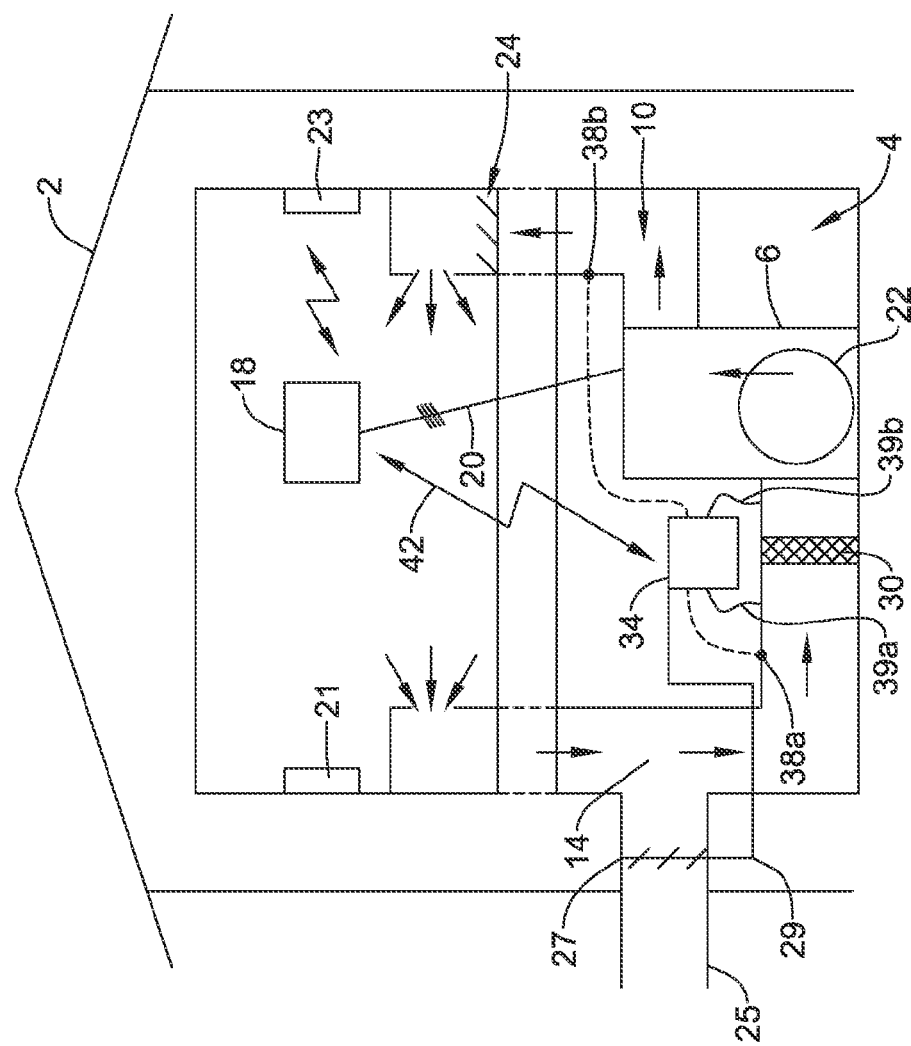
FIG. 1 is a schematic view of an illustrative HVAC system servicing a building.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure. In some cases, the HVAC controller(s) 18 may communicate with one or more remote sensors, such as a remote sensor 21, that may be disposed within the building 23. In some cases, a remote sensor 21 may measure various environmental conditions such as but not limited to temperature.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air and/or receives how much conditioned air from the HVAC component(s) 6. In some cases, the one or more HVAC controller(s) 18 may use information from the one or more remote sensors 21, which may be disposed within one or more zones, to adjust the position of one or more of the dampers 24 in order to cause a measured value to approach a setpoint in a particular zone or zones.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference (or absolute value) in temperature, flow rate, pressure, or a combination of any one of these parameters between the return air side and the discharge air side of the HVAC system 4. In some instances, absolute value is useful in protecting equipment against an excessively high temperature or an excessively low temperature, for example. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, it can be useful to measure pressure across the fan in order to determine if too much pressure is being applied as well as to measure pressure across the cooling A-coil in order to determine if the cooling A-coil may be plugged or partially plugged. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4. In other cases, the equipment interface module 34 may itself evaluate the system's operation and/or performance based on the collected data.

Figure 2:
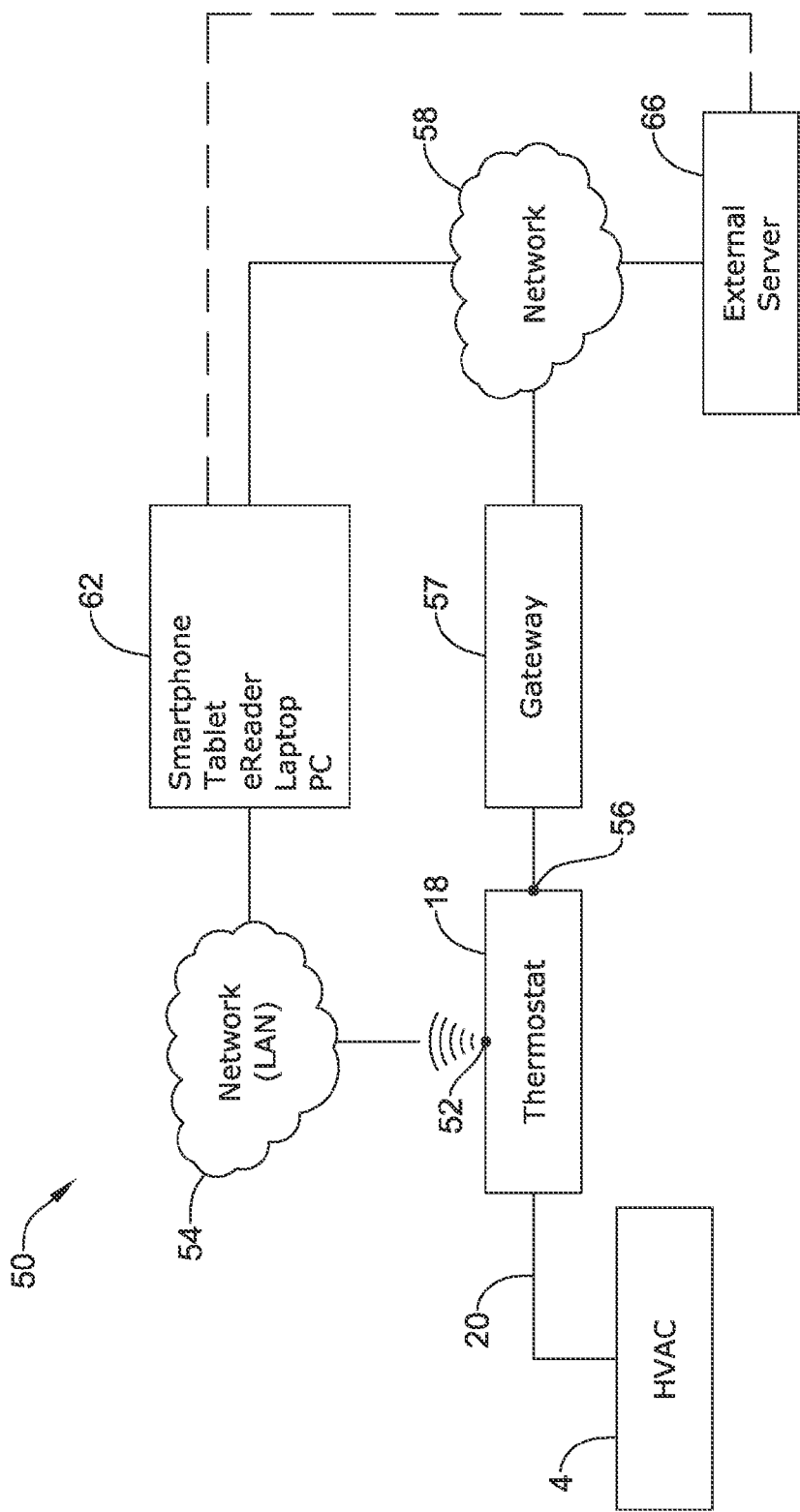
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless communication link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired. In some cases, the remote wireless devices 62 may communicate with the network 54 via the external server 66 for security purposes, for example.

In some cases, an application program code (i.e. app) stored in the memory of the remote wireless device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote wireless device 62. For example, through the user interface provided by the app, a user may be able to change operating parameter settings such as, for example, temperature set points, humidity set points, start times, end times, schedules, window frost protection settings, accept software updates and/or the like. Communications may be routed from the user's remote wireless device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote wireless device 62 where it may reflected by the application program executed by the remote wireless device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote wireless device 62 and the HVAC controller 18 without being relayed through a server such as external server 66. These are just some examples.

FIG. 1 provides an example of the HVAC system 4 as it may exist within the building 2. In some cases, there may be a desire to improve comfort control within the building 2, such as by adding a zoning system, increasing the number of zones in an existing zoned system, and/or reconfiguring an existing zoned system. A properly configured zoning system enables more accurate control of various environmental conditions within the building 2, such as but not limited to temperature, humidity and the like. While zoning systems can be built into an HVAC system such as the HVAC system 4 when the HVAC system 4 is initially installed within the building 2, in some cases it can be more difficult and/or more expensive to add/retrofit zoning into an existing HVAC system in an existing building. Described herein is a system including a plurality of individually controllable dampers as well as control functionality that is configured to be easily retrofitted into an existing HVAC system such as but not limited to the HVAC system 4 shown in FIG. 1. The system described herein may also be incorporated into new construction.

Figure 3:
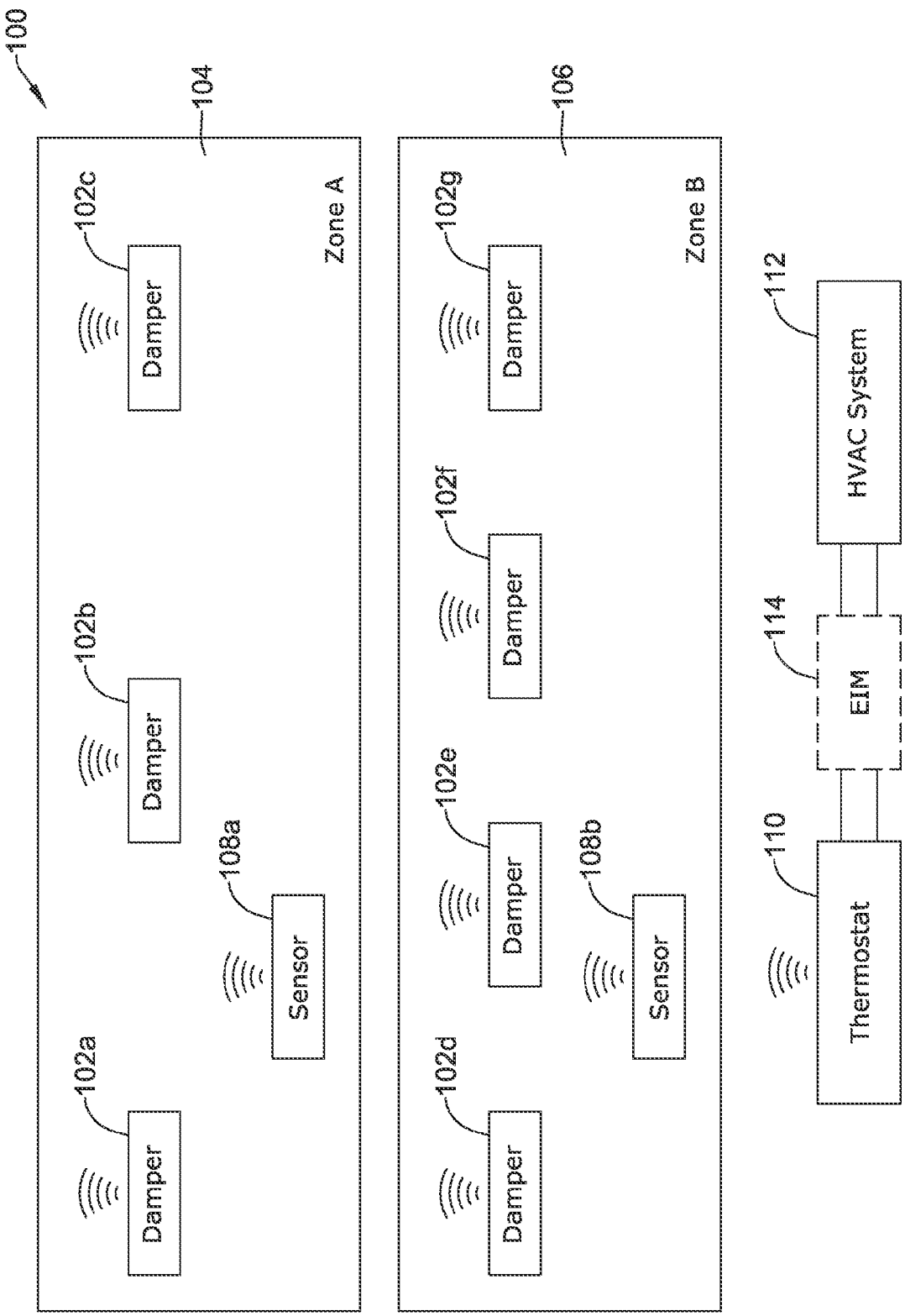
FIG. 3 is a schematic view of an illustrative zoned HVAC system that includes a number of wireless dampers.

FIG. 3 is a schematic illustration of an HVAC system 100 that includes a number of wireless dampers 102*a* through 102G that are organized into a Zone A, labeled as 104, and a Zone B, labeled as 106. In particular, and as illustrated, the Zone A (104) includes a total of three wireless dampers 102*a*, 102*b* and 102*c*, and the Zone B (106) includes a total of four wireless dampers 102*d*, 102*e*, 102*f* and 102*g*. It will be appreciated that the Zone A, labeled as 104, may include only one or two wireless dampers, or may include four or more wireless dampers. Similarly, the Zone B, labeled as 106, may include only one or two or three wireless dampers, or may include five or more dampers. In some cases, Zone A (104) may be a first room in a building while Zone B (106) may be a second room in the same building. In some cases, Zone A (104) may be a first part of room in a building while Zone B (106) may be a second part of the same room in the same building. In some instances, Zone A (104) and Zone B (106) may represent different floors in the same building. In some instances, while a total of two zones are illustrated, it will be appreciated that a building may have a greater number of zones.

As illustrated, the Zone A (104) includes a wireless sensor 108*a* while the Zone B (106) includes a wireless sensor 108*b*. While each Zone is illustrated as only having a single wireless sensor 108, it will be appreciated that in some cases, a particular Zone may have two or more wireless sensors 108. In some cases, the wireless sensor 108*a* may wirelessly communicate with one or more of the wireless dampers 102*a*, 102*b* and 102*c* that are within the Zone A (104) such that one or more of the wireless dampers 102*a*, 102*b* and 102*c* may open or close to either let additional conditioned air into the Zone A (104), or to reduce the inlet of conditioned air into the Zone A (104) in order to maintain a desired temperature, for example. In some cases, other air conditions that may be monitored and controlled include humidity, carbon dioxide, carbon monoxide, volatile organic compounds (VOCs), radon, particular matter, and others. In some cases, the wireless sensor 108 may additionally or alternatively communicate wirelessly with a thermostat 110 or other building controller (e.g. EIM) that may be considered as being an example of the HVAC controller 18 shown in FIGS. 1 and 2. In some cases, the thermostat 110 may directly control an HVAC system 112 that may be considered as being an example of the HVAC system 4 shown in FIGS. 1 and 2. In some instances, the thermostat 110 may instead communicate wirelessly or in a wired fashion with an equipment interface module (EIM) 114 that may be considered as an example of the EIM 34 shown in FIGS. 1 and 2. In some cases, one or more of the wireless sensors 108 may be a wired sensor that communicates with the an HVAC controller via a wired connection.

In some cases, each of the wireless dampers 102*a*, 102*b*, 102*c* within the Zone A (104) may open or close in unison, as directed by the thermostat 110. In some instances, depending on a current need for conditioned air, the thermostat 110 may direct one or two of the wireless dampers 102*a*, 102*b*, 102*c* to open or close while the remaining wireless dampers 102*a*, 102*b*, 102*c* are left in their current position. Similarly, each of the wireless dampers 102*d*, 102*e*, 102*f*, 102*g* within the Zone B (106) may open or close in unison, as directed by the thermostat 110. In some instances, depending on a current need for conditioned air, the thermostat 110 may direct one or two of the wireless dampers 102*d*, 102*e*, 102*f*, 102*g* to open or close while the remaining wireless dampers 102*d*, 102*e*, 102*f*, 102*g* are left in their current position. In some instances, as will be discussed, the selection of which wireless dampers to move may depend on relative battery levels of the wireless dampers (e.g. move those wireless dampers that have a higher remaining battery charge level).

In some cases, the wireless dampers 102*a*, 102*b*, 102*c*, 102*d*, 102*e*, 102*f* and 102*g*, and other wireless dampers if present, may be installed during a process of installing the HVAC system 100. In some cases, however, the wireless dampers 102*a*, 102*b*, 102*c*, 102*d*, 102*e*, 102*f* and 102*g*, and other wireless dampers if present, may be installed into an existing HVAC system to retrofit zoning into the existing HVAC system. As noted above, a particular zone may correspond to a particular room in a building, or to a group of rooms within the building, or perhaps to a floor or level within the building. It will be appreciated that by making zones smaller, it can be easier to more accurately control environmental conditions within the building. Because the HVAC system 100 may in some cases represent a retrofit system that is installed into an existing HVAC system (such as the HVAC system 4), there are advantages in having each of the wireless dampers 102*a*, 102*b*, 102*c*, 102*d*, 102*e*, 102*f* and 102*g* communicate wirelessly, to avoid having to run communication wires between each of the wireless dampers 102*a*, 102*b*, 102*c*, 102*d*, 102*e*, 102*f* and 102*g* and the thermostat 110, for example.

As will be appreciated, each zone (such as the Zone 104 and the Zone 106 shown) may include one or more sensors 108 that may measure a variety of different environmental parameters such as but not limited to temperature, humidity, air quality and the like. Such sensors 108 may enable the thermostat 110 and/or the EIM 114 to operate the HVAC system 112 in a manner that enables the HVAC system 112 to maintain environmental parameters within desired ranges for each of the zones. In some cases, each zone may be controlled separately, and may for example have unique setpoints on a zone by zone basis. For example, a zone covering a portion of a building that is generally occupied during a particular time of day may have a first set of desired environmental parameter settings while another zone covering another portion of the building that is generally unoccupied during that same particular time of day may have a second set of desired environmental parameter settings that can be substantially different from the first set of desired environmental parameter settings.

In some cases, the HVAC system 112 may be operated in accordance with the zone of greatest demand (ZGD). The ZGD may be determined by which zone has the greatest differential between a current value for a particular environmental parameter (e.g. temperature) and a setpoint for that particular environmental parameter (e.g. temperature setpoint). In some cases, the thermostat 110 may also track historical data to help ascertain the ZGD.

As an example, a first zone may have a current temperature that is one degree above the current temperature setpoint. A second zone may have a current temperature that is at the current temperature setpoint. A third zone may have a current temperature that is five degrees below the current temperature setpoint. In this scenario, assuming the HVAC system 112 is in a heating mode, the third zone would be the ZGD, and the HVAC system 112 would begin providing heat. The damper(s) in the third zone would be fully open, while the damper(s) in the first zone and the second zone would likely be fully closed in this example. Over time, however, the control may be configured to converge on a set of damper positions that is largely steady state, and the control may makes only minor changes often to limited dampers to account for thermal load changes within the building that often have relatively long time constants (e.g. tens of minutes to hours).

In some cases, say if only one zone is demanding conditioned air (heated air, cooled air or ventilated air, for example), the dampers in the other zones may not be able to simply stay shut. It will be appreciated that in order to protect the HVAC equipment from excessive pressure and/or excessive temperature deltas, it may be necessary to provide a bypass for at least some of the conditioned air, or to open and close dampers in the other zones in accordance with a PI (proportional integral) or other control algorithm, thereby protecting the HVAC equipment while largely satisfying environmental parameter settings in each zone. This can also help with preventing high limit cycling and fan wear.

In some instances, the HVAC system 112 may be configured to support automatic change over (ACO), which means the system can automatically switch from heat mode to cool mode, or vice versa. This can be based on an aggregate thermal demand of the zones, or perhaps be based on the thermal demand of a majority of the zones. In some cases, ACO includes dynamic change with heat, purge, cool, purge, repeat. There are several ways of accomplishing this. One ACO example is to switch between heat and cool every twenty minutes with equipment protection. In some cases, the system can track one ZGD for heating and another ZGD for cooling. In some instances, occupancy-based priority may be given to provide comfort in occupied zones in favor of conditions within one or more unoccupied zones.

In some cases, the HVAC system 112 may be a forced air system (similar to FIG. 1) that provides conditioned air, including heated air and/or cooled air, through a series of ducts that emanate through the building from a source of conditioned air, such as but not limited to a forced air furnace. The series of ducts provide conditioned air to a plurality of register vents that may be distributed throughout the building. In some cases, there may be a transition element known as a register boot that transitions between the duct run, which is frequently a round duct having a 6 inch or perhaps an 8 inch diameter, to the register vent, which is frequently (but not always) rectilinear in shape. In some instances, the register boot, in addition to providing a transition in shape between a round duct and a rectilinear register vent, may in some cases also provide a transition in direction. For example, a rectilinear register vent cut into a floor, with the register vent facing upwards, may be supplied with conditioned air via a round duct that runs parallel to (but underneath) the finished floor, and the corresponding register boot disposed therebetween may be configured to change the direction of the conditioned air flowing from the duct to and through the register vent.

One problem with retrofitting a damper system into the register vents of an existing HVAC system is the large number of damper configurations that must be produced in order to handle the wide array of register vent and register boot configurations that out on the market. Moreover, it will be appreciated that the geometry of the duct and the register boot may present difficulties in fitting a wireless damper 102a, 102b, 102c, 102d, 102d, 102f, 102g in position within the building's ductwork in retrofitting a zoning system into an existing HVAC system.

Figure 4:
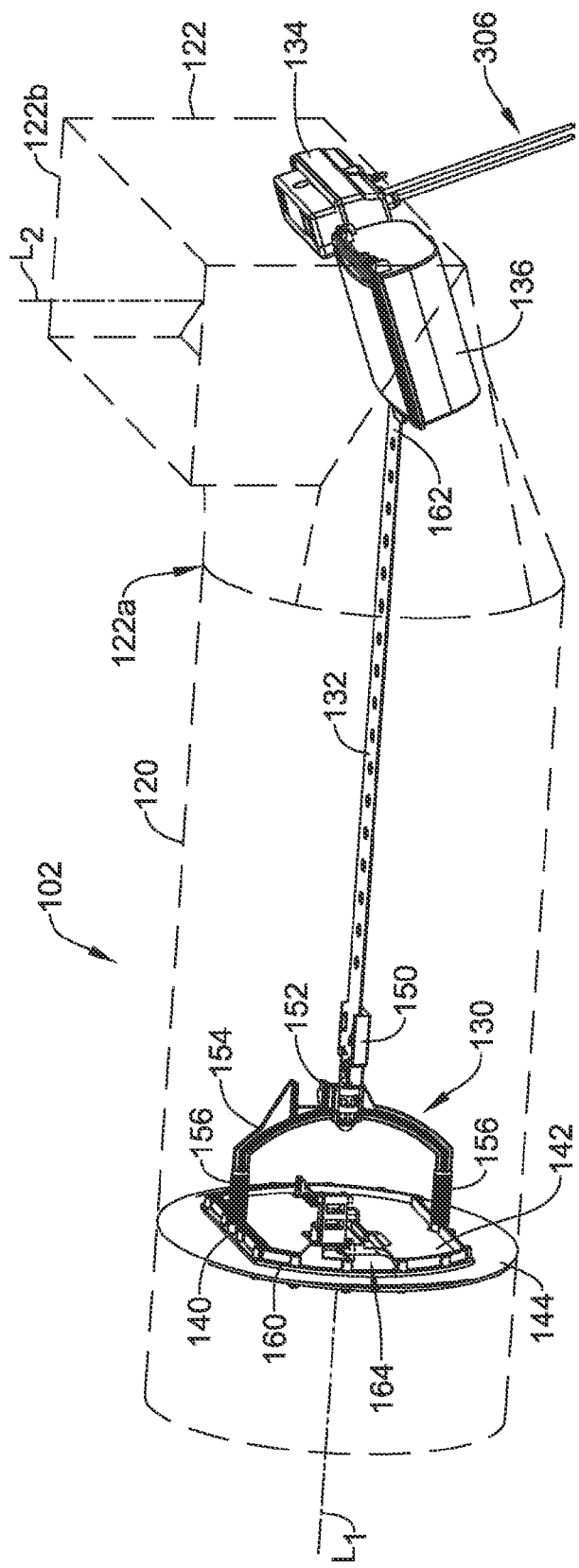
FIG. 4 is a perspective view of an illustrative damper deployed within a building's ductwork.

FIG. 4 provides an illustration of a portion of a duct and a register boot. The duct and the register boot are shown as being transparent, in order to illustrate particular features of a damper 102. A portion of a duct 120 is illustrated, although it will be appreciated that in an HVAC system, the duct 120 would continue to the left, perhaps to a larger supply duct, that in turn is fed conditioned air via a forced air furnace or the like. The duct 120 may be considered as having a longitudinal axis L1. A register boot 122 is operably coupled to the duct 120, and may be considered as having a longitudinal axis L2 that is at least substantially orthogonal, or forming a 90 degree angle with, the longitudinal axis L1 of the duct 120. As can be seen, the register boot 122 changes the direction of the conditioned air flowing from the duct 120 into and through the register boot 122. A register vent (not shown) is typically provided over the output 122b of the register boot 122.

An illustrative damper 102 may be seen as being positioned within the duct 120 and the register boot 122. The damper 102 includes a damper assembly 130 that is operably coupled to an elongated deployment member 132. As will be discussed, the elongated deployment member 132 is flexible in at least one direction in order to use the elongated deployment member 132 to advance the damper assembly 130 through a throat of the register boot 122 and into position within the duct 120 from a position in or near the register boot 122.

In some cases, the duct 120 has a circular cross-sectional profile while a register vent (not shown) has a non-circular profile. As shown in FIG. 4, the register boot 122 provides a transition from the circular profile to the non-circular profile. In some instances, the register boot 122 has an input 122a that is circular and an output 122b that is rectangular. In some cases, as shown, the input 122a faces a direction that is about 90 degrees offset from a direction that the output 122b faces. The elongated deployment member 132 may be bendable by an installer in at least one direction to accommodate this transition in direction.

In some cases, the elongated deployment member 132 may be considered as being flexible along its length in one lateral direction while being rigid (or more rigid) in an orthogonal lateral direction. In some cases, the elongated deployment member 132 has a cross-sectional profile that is much wider in one dimension and much thinner in a second direction that is orthogonal to the first dimension. For example, in some cases, the elongated deployment member 132 may have a cross-sectional profile that is at least five times wider than it is thick. In some cases, the elongated deployment member 132 may be considered as having a length sufficient to permit the damper assembly 130 to be disposed within the duct 120 upstream of the register boot 122 while a downstream end of the elongated deployment member 132 is securable to the register boot 122.

In some cases, the elongated deployment member 132 may have a length that is in a range of about 1 foot to about 5 feet. In some instances, the elongated deployment member 132 may have a length that is in a range of about 2 feet to about 4 feet, or in some cases may have a length that is in a range of about 2.5 feet to about 3.5 feet. In some cases, any extra length of the elongated deployment member 132, beyond what is needed to position the damper assembly 130 within the duct 120 and to secure a downstream end of the elongated deployment member 132 within the register boot 122 may simply be bent over into the register boot 122, or may be cut off if desired.

The illustrative damper 102 also includes a control module 134 and a power module 136. In some cases, the control module 134 and the power module 136, each of which will be discussed in greater detail, may be configured to be secured in position in or near the register boot 122 so as to be easily reachable after removing the register vent. In some cases, the control module 134 may be operably coupled to the damper assembly 130 via two or more electrical wires (not shown). In some cases, the power module 136 may be operably coupled to the control module 134 via two or more electrical wires (not shown).

The control module 134 may be configured to control operation of the damper assembly 130. In some instances, as shown, the control module 134 includes an antenna 306 (see also FIGS. 11 and 12) for wireless communication (such as with the wireless sensor 108*a*, 108*b* and/or with the thermostat 110) that can be inserted through a hole formed in a side wall of the register boot 122 to avoid signal strength issues that could otherwise result from being inside a metal enclosure formed by the duct 120 and the register boot 122. In some cases, the power module 136 may include replaceable batteries, so locating and reaching the power module 136 within the register boot 122 can be beneficial.

As illustrated, the damper assembly 130 is shown in an operational configuration in which the damper assembly 130 is secured in place within the duct 120 but is also in a configuration in which the damper assembly 130 is able to have an impact on the flow of conditioned air flowing through the duct 120 and past the damper assembly 130. In the operational configuration, it can be seen that the damper assembly 130 is situated generally perpendicular to the elongated deployment member 132. In the example shown, the damper assembly 130 includes a damper frame 140 and a damper blade 142 that is disposed relative to the damper frame 140, and is configured to pivot relative to the damper frame 140 between a closed position (as illustrated) in which the damper blade 142 is at least substantially parallel (or coplanar) with the damper frame 140 (and parallel with the longitudinal axis L1) and an open position in which the damper blade 142 has rotated to a position in which the damper blade 142 is at least substantially perpendicular to the damper frame 140 (and perpendicular to the longitudinal axis L1). In some cases, the open position may refer to a position in which the damper blade 142 has rotated less than 90 degrees relative to the closed position shown. In some instances, the open position may refer to a position in which the damper blade 142 has rotated more than 90 degrees relative to the closed position shown. It will be appreciated that in some cases the damper blade 142 may be rotatable to a plurality of intermediate positions that are somewhere between a fully open and a fully closed position.

The illustrative damper assembly 130 includes a resilient seal 144 that extends radially outwardly from the damper frame 140. When the duct 120 is round, the resilient seal 144 has an at least substantially round outer profile in order to sealingly engage an inner surface of the duct 120. In some cases, the resilient seal 144 has a diameter that is greater than an anticipated inner diameter of the duct 120, in order to better seal against the inner surface of the duct 120 and to accommodate any variations in the shape of the duct 120, such as if the duct 120 is not perfectly round, or is dented. In some cases, the duct 120 may be formed of a flexible material, in which case the resilient seal 144 has to seal against a more dynamic surface than if the duct 120 is made of smooth metal. In some cases, the duct 120 may be constructed of a plastic covered spiral metal wire with an associated non-uniform inner surface. For example, for use in a duct 120 having a diameter of six inches, the resilient seal 144 may have an outer diameter of up to about six and a half or seven inches. In some cases, the resilient seal 144 may be configured to bend, fold or rollover on itself in order to consistently seal against the inner surface of the duct 120, and to help the damper assembly 130 fit through the throat of the register boot 122 during deployment. In some cases, the resilient seal 144 may be referred to as a duct seal that is more flexible than the damper frame 140.

In the example shown, the elongated deployment member 132 is coupled to a coupler 150, which is itself rotatably engaged with an engagement feature 152 forming a portion of a damper insert arm 154. In some cases, as will be discussed, the relative rotation between the coupler 150 and the engagement feature 152 may be limited, thereby allowing the elongated deployment member 132 to rotate relative to the damper assembly 130 during smaller rotational movement of the elongated deployment member 132 yet cause the damper assembly 130 to rotate with the elongated deployment member 132 during larger rotational movements of the elongated deployment member 132.

The damper insert arm 154 is movable between the deployment configuration, in which the damper insert arm 154 is at least substantially parallel with the damper frame 140, and the operational configuration (shown in FIG. 4), in which the damper insert arm 154 is at least substantially perpendicular to the damper frame 140. In some cases, the damper insert arm 154 is biased into the operational configuration by a biasing force, and is temporarily held against this biasing force when held in the deployment configuration. In some cases, the damper insert arm 154 may include a pair of biasing springs 156 that bias the damper insert arm 154 into the operational configuration. In some cases, as will be discussed, the damper insert arm 154 may be configured such that the damper insert arm 154 can be released from the deployment configuration, into the operational configuration, by an installer who is in an installation position that is either within or even downstream of the register boot 122.

The damper assembly 130 may be considered as being configured for placement within a duct 120 of an existing ductwork system. The damper assembly (or damper) 130 may be configured to articulate from the deployment configuration, which facilitates advancing the damper 130 through the throat of the register boot 122 and into the duct 120, to an operational configuration (as shown in FIG. 4) in which the damper 130 is positioned within the duct 120 and is able to selectively control how much conditioned air supplied to the duct 120 is permitted to pass by the damper 130 and exit the register vent (not illustrated). In some cases, the damper frame 140 may be considered as having a frame periphery 160, and the resilient seal 144 may extend radially outwardly from the frame periphery 160. The resilient seal 144, which may be considered to be flexible, engages the inner surface of the duct 120 when in the operational configuration. In some cases, a frictional engagement between the resilient seal 144 and an inner surface of the duct 120 helps secure the damper 130 within the duct 120.

It will be appreciated that the elongated deployment member 132 facilitates advancement of the damper 130 through the register boot 122 and into the duct 120, and moreover is configured to help retain the damper 130 in position within the duct 120 by anchoring at least a portion of the elongated deployment member 132 downstream of the damper 130. In some cases, at least a portion of the elongated deployment member 132 may be bent into contact with a side wall of the register boot 122, and may be secured to the side wall of the register boot 122. This may be accessible to an installer through the output 122*b* of the register boot 122 after the register vent is removed. In some cases, the elongated deployment member 132 has an end portion 162 that is opposite where the elongated deployment member 132 is secured to the damper assembly 130, and the end portion 162 may be configured to be secured to a wall of the register boot 122 to help hold the damper assembly 130 in the duct 120 when the damper assembly 130 is in the operational configuration. In some cases, it will be appreciated that the damper assembly 130 may be located and secured in position within the duct 120, upstream of the register boot 122, by an installer at an installation position within or downstream of the register boot 122.

The illustrative damper assembly 130 includes a drive motor 164 that is configured to rotate the damper blade 142, relative to the damper frame 140, between a closed end position (illustrated in FIG. 4) in which air moving through the duct 120 is restricted from flowing past the damper blade 142 and through a register vent downstream of the damper assembly 130, and an open end position (see FIG. 7) in which air moving through the duct 120 is less restricted from flowing past the damper blade 142 and through a register vent downstream of the damper assembly 130.

Figure 5:
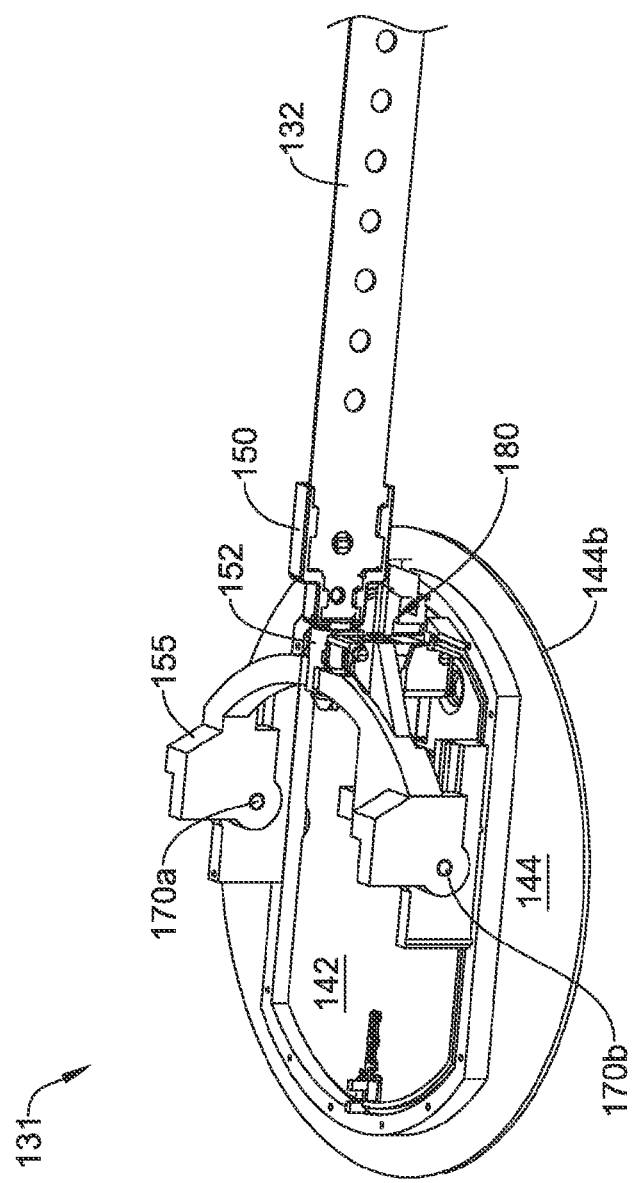
FIG. 5 is a perspective view of an illustrative damper assembly shown in a deployment configuration.
Figure 6:
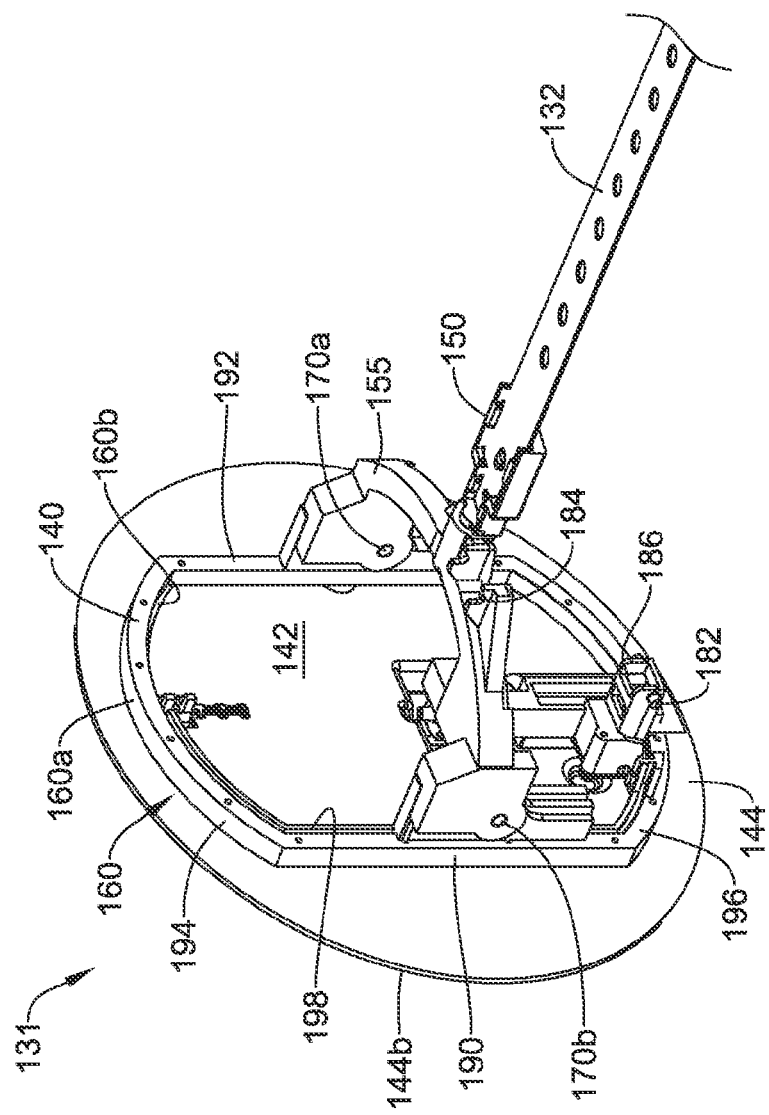
FIG. 6 is a perspective view of an illustrative damper assembly shown in an operational configuration, with the damper blade in a closed position.
Figure 7:
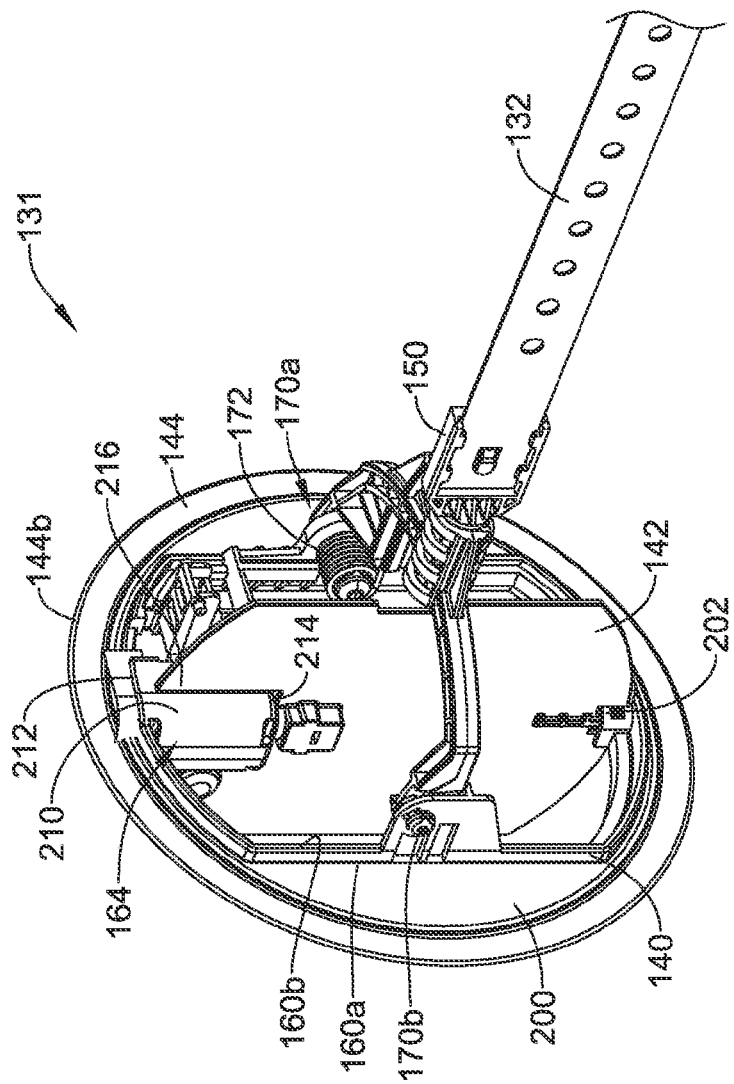
FIG. 7 is a perspective view of an illustrative damper assembly shown in an operational configuration, with the damper blade in an open position.

FIGS. 5-7 show a damper assembly 131 that is similar to the damper assembly 130, but includes a damper insert arm 155 that is different from the damper insert arm 154 of FIG. 4. Rather than including a pair of biasing springs 156 that secure the damper insert arm 154 to the damper frame 140, the damper insert arm 155 in FIGS. 5-7 is pivotably secured to the damper frame 140 via a pair of pivot points 170a and 170b. A spring 172 (visible in FIG. 7) is configured to bias the damper assembly 131 into the operational configuration shown in FIGS. 6 and 7. When the damper assembly 131 is in the deployment configuration shown in FIG. 5, the damper insert arm 155 is held in the deployment configuration, against the biasing force of the spring 172, via a latch mechanism 180. The latch mechanism 180 includes a pin 182 (visible in FIG. 6) that releasably engages a corresponding cutout 184 that is formed as part of the damper insert arm 155. In some cases, there are a pair of pins 182, on either side of a locking structure 186. In some cases, there are a pair of cutouts 184, configured to releasably engage each of the pair of pins 182. The damper assembly 131 may be moved into the deployment configuration shown in FIG. 5 by pushing the damper insert arm 155 downward against the biasing force such that the pins 182 are able to engage the cutouts 184. This may include temporarily moving the locking structure 186 out of the way, then releasing the locking structure 186 so that the pins 182 engage the cutouts 184.

It will be appreciated that when the damper assembly 131 is in the deployment configuration, the damper assembly 131 may be more easily inserted into and through the throat of the register boot 122 and into position within the duct 120. One feature that helps with insertion is the physical configuration of the damper frame 140 and the damper blade 142. Looking at the damper frame 140, as visible for example in FIG. 6, the damper frame 140 including the frame periphery 160 has an outer frame periphery 160a and an inner frame periphery 160b. The resilient seal 144 extends radially outwardly from the outer frame periphery 160a. As will be discussed, the inner frame periphery 160b provides a seal against the damper blade 142 when the damper blade is in the closed position, as shown for example in FIGS. 5 and 6. In some cases, as illustrated, the frame periphery 160 (which can include the outer frame periphery 160a and/or the inner frame periphery 160b) has an at least substantially obround shape.

An obround shape is a two-dimensional shape that includes a rectangle with semicircles at either end. This is also known as a stadium shape and/or a disco rectangle. A shape that is substantially obround in shape refers to a rectangle that has two curved ends spanning a pair of parallel straight or at least substantially straight sides, but with each curved end only representing a portion of a circle, rather than a full semicircle. This shape is illustrated for example in FIG. 6, where the damper frame 140 may be seen as having a first straight side 190, a second straight side 192 that is at least substantially parallel to the first straight side 190, a first curved side 194 spanning between the first straight side 190 and the second straight side 192, and a second curved side 196 opposite the first curved side 194 and spanning between the first straight side 190 and the second straight side 192. In some cases, as shown, the first straight side 190 and the second straight side 192 both have a length that is greater than a distance (measured orthogonally to the length) between the first straight side 190 and the second straight side 192. The damper blade 142 may be seen as having a damper blade periphery 198 that is complementary to a shape of the inner frame periphery 160b, and thus is also at least substantially obround in shape. In some cases, the damper blade 142 may be considered as having a first dimension across the damper blade 142 in a first direction, and a second dimension across the damper blade 142, orthogonal to the first direction, that is less than the first dimension. The resilient seal 144, however, may be seen as having a circular or at least substantially circular shape in order to seal against an inner surface of the duct 120.

Looking for example at FIG. 5, it will be appreciated that the at least substantially obround shape of the damper frame 140 and the damper blade 142, in combination with the orientation of the damper assembly 131 relative to the elongated deployment member 132 maximizes an overall area of the damper blade 142, thus maximizing possible air flow through the damper assembly 131, while minimizing the effective deployment configuration profile of the damper assembly 131 in order to facilitate advancement of the damper assembly 131 into and through the throat of the register boot 122 and into the duct 120. As will be appreciated, the resilient seal 144 is sufficiently flexible to bend out of the way as the damper assembly 131 is advanced through the throat of the register boot 122 and into the duct 120. In some cases, the duct 120 may include a balancing damper, and the effective deployment configuration profile may assist in being able to advance the damper assembly 131 through and past any such balancing damper. It will be appreciated that any balancing dampers may be manually moved to a fully open position before the damper assembly 131 is advanced through the balancing damper.

With reference to FIGS. 6 and 7, the inner frame periphery 160b defines an air flow aperture 200. The damper blade 142 is pivotably secured to the damper frame 140 at a pivot point 202, and is pivotable between a closed position (see FIG. 6) in which the damper blade 142 seals against the damper frame 140 and the damper blade 142 substantially blocks air flow through the air flow aperture 200, and an open position (see FIG. 7) in which the damper blade 142 does not seal against the damper frame 140 and allows air flow through the air flow aperture 200. In some cases, the seal between the damper blade 142 and the damper frame 140 may be considered to be an inner seal while a seal between the resilient seal 144 and an inner surface of the duct 120 may be considered as being an outer seal.

Figure 8:
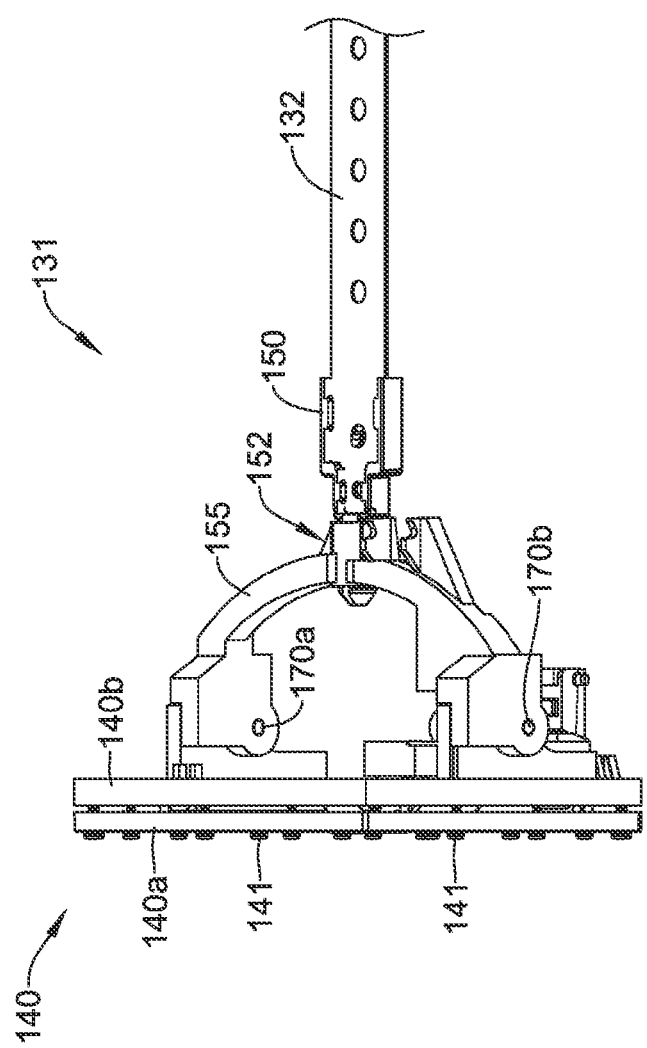
FIG. 8 is a side perspective view of a portion of an illustrative damper assembly.

FIG. 8 is a perspective view of the damper assembly 131 with the resilient seal 144 removed to reveal that in some cases, the damper frame 140 includes an upstream damper frame member 140a and a downstream damper frame member 140b that are secured together. It will be appreciated that in some cases, the resilient seal 144 may include an inner portion that is secured (e.g. clamped) between the upstream damper frame member 140a and the downstream damper frame member 140b. In some cases, for example, the upstream damper frame member 140a may be secured to the downstream damper frame member 140b via a plurality of screws 141. In other cases, the upstream damper frame member 140a may engage the downstream damper frame member 140b in a snap-fit connection, or the upstream damper frame member 140a may be adhesively secured to the downstream damper frame member 140b.

In some cases, when the damper blade 142 is in the closed position, at least part of the damper blade 142 seals against the downstream damper frame member 140b. In some instances, the damper frame 140, including the downstream damper frame member 140b, may be considered as being rigid, and thus providing a consistent seal surface against which the damper blade 142 (or a damper blade periphery 198) may seal when in the closed position. In some cases, the outer frame periphery 160a may be considered as defining a first shape while an outer periphery 144b (shown in FIG. 6) defines a second shape. In some cases, the first shape may be obround while the second shape may be round. Alternatively, the first shape may be obround while the second shape may be rectangular. In some cases, as shown for example in FIG. 8A, the damper frame may instead be a single structure.

Figure 8A:
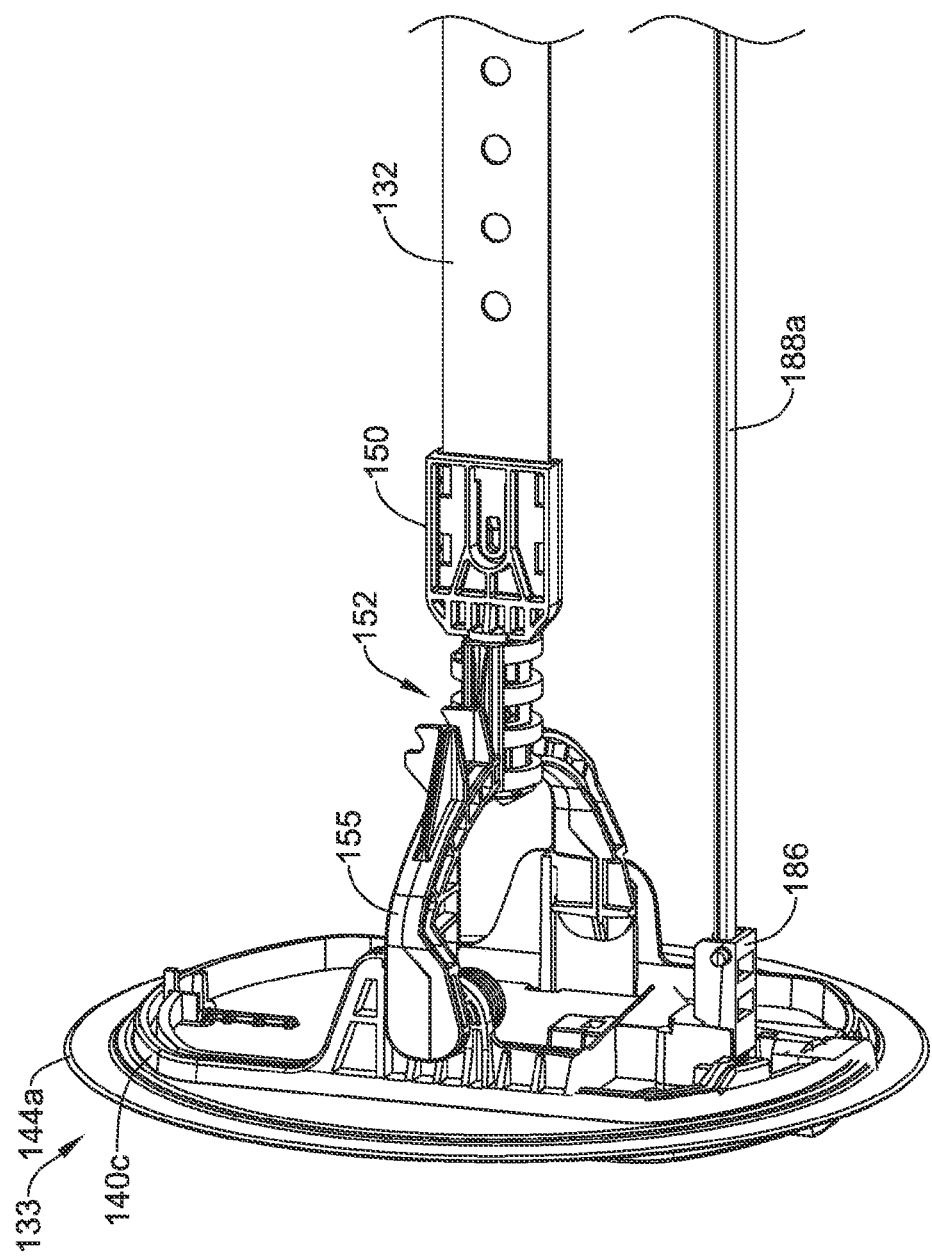
FIG. 8A is a side perspective view of an illustrative damper assembly.
Figure 8B:
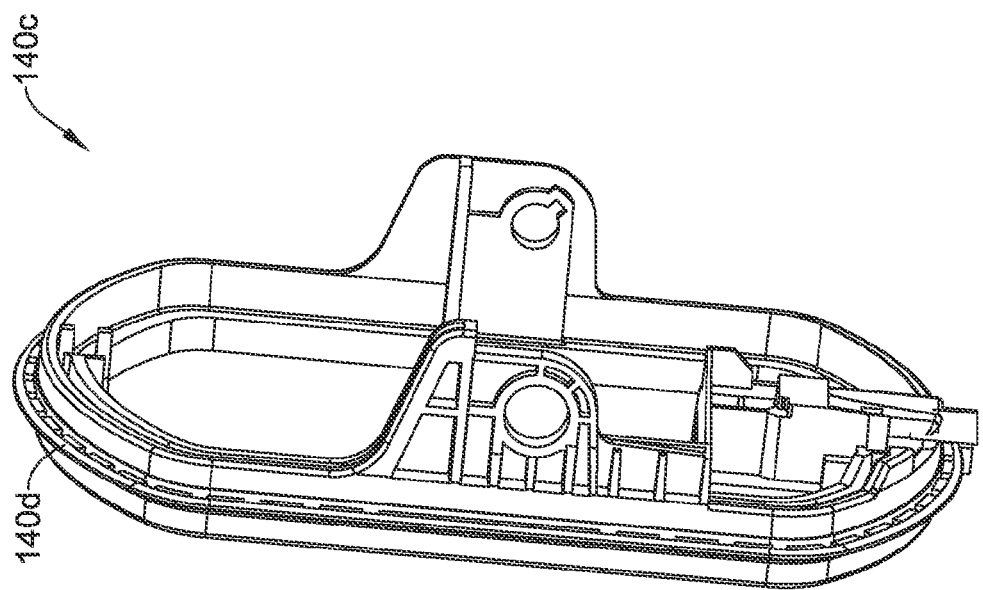
FIG. 8B is a side perspective view of a portion of the illustrative damper assembly of FIG. 8A.

FIG. 8A is a side perspective view of a damper assembly 133 that includes a unitary damper frame member 140c and a resilient seal 144a that is molded into the unitary damper frame member 140c. In particular, and as shown in FIG. 8B, the unitary damper frame member 140c includes a seal securement member 140d that extends radially from the unitary damper frame member 140c so that the resilient seal 144a may be molded around and into the seal securement member 140d. FIG. 8C shows the resilient seal 144a absent the unitary damper frame member 140c. As can be seen, the resilient seal 144a includes an engagement region 140e. As can be seen, there is a complementary relationship between the seal securement member 140d of the unitary damper frame member 140c and the engagement region 140e of the resilient seal 144a that serves to lock the resilient seal 144a to the unitary damper frame member 140c.

FIG. 8A also illustrates an electrical control cable 188a that extends through the locking structure 186. In some cases, the electrical control cable 188a may extend between the control module 134 and the damper assembly 133 in order to provide control commands and/or electrical power in an appropriate polarity to actuate the damper assembly 133 towards a more open position or a more closed position, depending on polarity. As will be discussed with respect to FIG. 9, when the damper assembly 133 is in the deployment configuration, in which the damper assembly 133 is rotated about 90 degrees relative to the operation configuration shown in FIG. 8A, pulling on the electrical control cable 188a can provide a lateral force on the locking assembly 186, thereby moving the locking assembly 186 sufficiently to release the damper assembly 133 from the deployment configuration such that the damper assembly 133 may regain the operation configuration.

Figure 9:
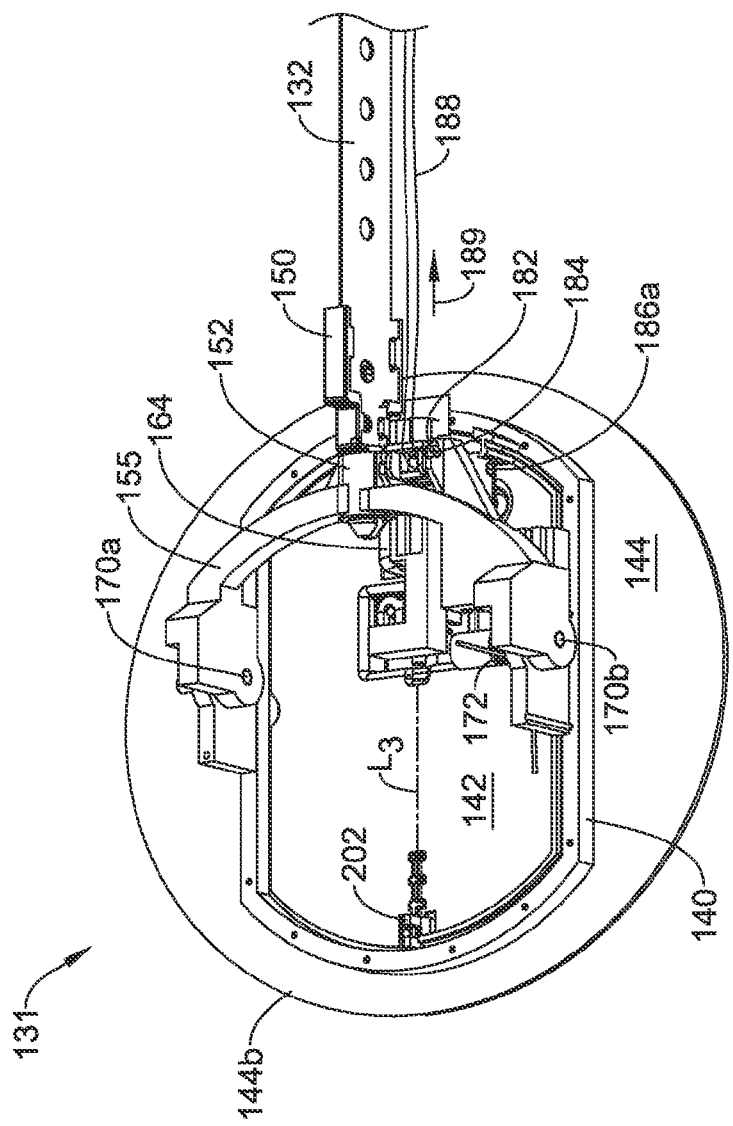
FIG. 9 is a perspective view of an illustrative damper assembly.

FIG. 9 is a perspective view of the damper assembly 131 in the deployment configuration. As discussed, the illustrative damper assembly 131 includes a locking structure 186 bearing one or more pins 182 that releasably engage a corresponding one or more cutouts 184 formed in the damper insert arm 155. It will be appreciated that once the damper assembly 131 has been inserted through the register boot 122 and into the duct 120, the latch mechanism 180, including the locking structure 186, will be in the duct 120, and thus not easily reached from an installer position within or outside of the register boot 122. In some cases, the latch mechanism 180 may be remotely released from the deployment configuration to the operation configuration from an installer position within or outside of the register boot 122.

In some cases, an elongate release mechanism 188 may extend from a position near a far end of the elongated deployment member 132, for example, to a position where the elongate release mechanism 188 may engage the locking structure 186 and/or pass through the locking structure 186. By pulling proximally on the elongate release mechanism 188, because the elongate release mechanism 188 extends into the locking structure 186, this exerts a force orthogonally to the latch mechanism 180 and in particular orthogonal to the locking structure 186, thereby causing the locking structure 186 to pivot along a pivot point 186a in the direction indicated by an arrow 189. This moves the pins 182 out of engagement with the cutouts 184, and thus the damper insert arm 155 is free to move back into the operational configuration, driven by the biasing force applied by the spring 172. In some cases, the elongate release mechanism 188 may be an elongate rod that engages the locking structure 186. In some cases, the elongate release mechanism 188 may be an electrically conductive cable providing power and/or control commands to the damper assembly 131.

As seen in FIG. 9, the damper blade 142 may be considered as having an axis of rotation L3 that intersects the drive motor 164. In some cases, the axis of rotation L3 may be considered as being at least substantially parallel with the first straight side 190 and/or the second straight side 192. In some cases, the drive motor 164 includes (see FIG. 7) a drive motor body 210 having a first end 212 and an opposing second end 214. The first end 212 may be secured to the damper frame 140 while the second end 214 may extend towards the damper blade 142. In some cases, the damper blade 142 includes a cutout 216 that is configured to accommodate at least part of the drive motor body 210 when the damper blade 142 rotates relative to the drive motor 164 and relative to the damper frame 140. In some cases, the second end 214 of the drive motor body 210 may include a drive shaft extending from the second end 214.

Figure 10:
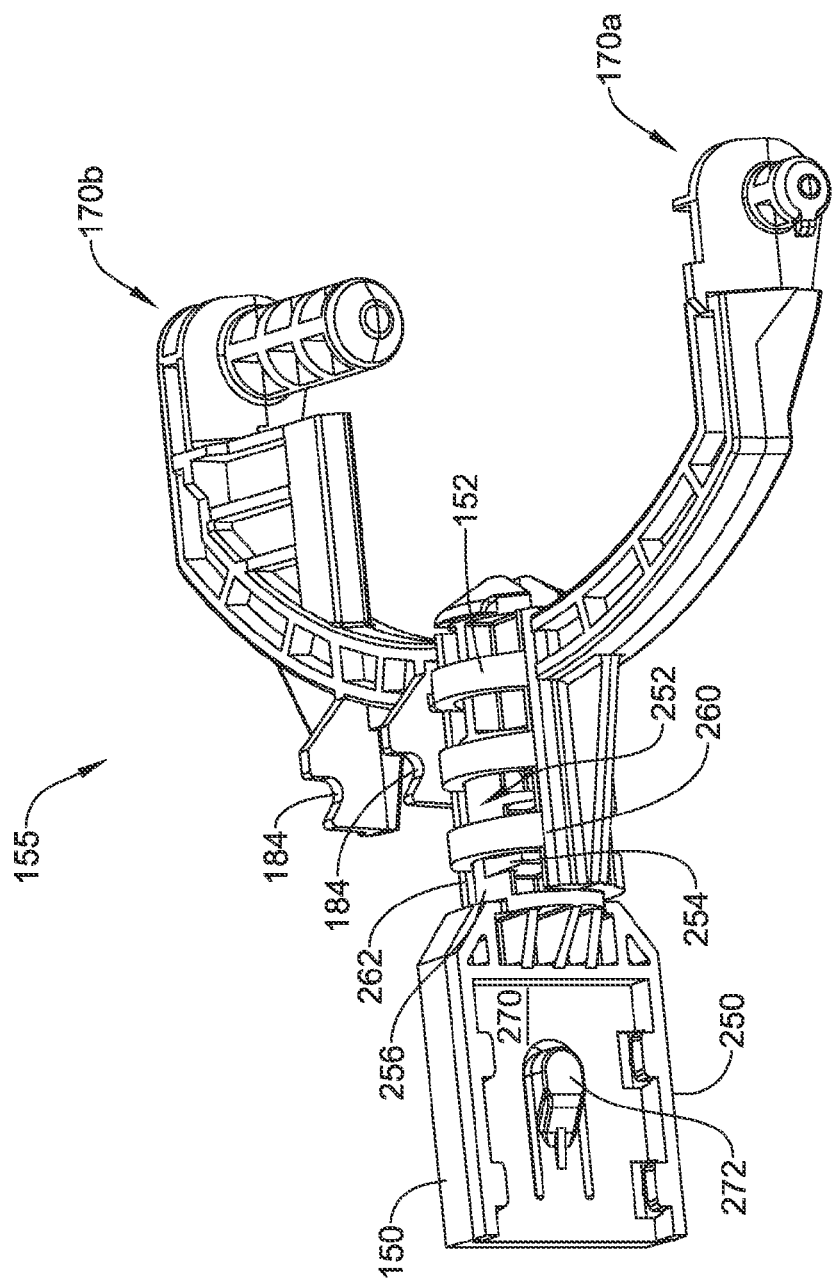
FIG. 10 is a perspective view of a portion of an illustrative damper assembly.

As noted above, the elongated deployment member 132 may be coupled to the coupler 150. As can be seen for example in FIG. 10, which is a perspective view of the damper assembly 131, the coupler 150 may include a first portion 250 that is configured to engage an end of the elongated deployment member 132 and a second portion 252 that is configured to extend into the engagement feature 152 of the damper insert arm 155 and rotate relative to the engagement feature 152. The first portion 250 includes a recess 270 that is configured to accommodate an end of the elongated deployment member 132 as well as a locking feature 272 that engages a corresponding aperture within the elongated deployment member 132 to lock the elongated deployment member 132 to the coupler 150. In some cases, the locking feature 272 includes a living hinge that enables the locking feature 272 to flex when a first end of the elongated deployment member 132 is inserted into the recess 270.

In some cases, there may be a desire to permit limited rotation of the elongated deployment member 132 relative to the damper assembly 131 while not permitting further relative rotation. This may be useful when deploying the damper assembly 131 through the register boot 122 and into the duct 120. Because the elongated deployment member 132 is flexible in at least one lateral direction while being more rigid in an orthogonal lateral direction, permitting some rotation enables the installer to flex or bend the elongated deployment member 132 while inserting the damper assembly 131 into the duct 120. Because the installer may also wish to be able to rotate the damper assembly 131 relative to the register boot 122 and/or duct 120, the damper assembly 131 may be configured to limit such rotation.

In some cases, as shown, the second portion 252 may include a rotation limit feature 254 that extends outwardly from a surface 256 of the second portion 252. In some cases, as shown, the engagement feature 152 includes a first axially aligned feature 260 and a second axially aligned feature 262 that is parallel with the first axially aligned feature 260. The rotation limit feature 254 is configured to be able to rotate freely between the first axially aligned feature 260 and the second axially aligned feature 262, but is configured to engage the first axially aligned feature 260 if rotated too far in a first direction and to engage the second axially aligned feature 262 if rotated too far in a second, opposing, direction. Accordingly, the elongated deployment member 132 is permitted to rotate a certain amount relative to the damper assembly 131, while further rotation of the elongated deployment member 132 causes rotation of the damper assembly 131.

As an example, the elongated deployment member 132 may be permitted to rotate up to 90 degrees relative to the damper assembly 131 before the damper assembly 131 rotates with the elongated deployment member 132. In some cases, the rotation limit feature 254 may run into one of the first axially aligned feature 260 and the second axially aligned feature 262 when the coupler 150 is rotated counter clockwise to a 0 degree position and the rotation limit feature 254 may run into the other of the first axially aligned feature 260 and the second axially aligned feature 262 when the coupler 150 is rotated clockwise to a 90 degree position. This is just an example, as of course clockwise and counterclockwise depend on a relative reference frame.

Figure 11:
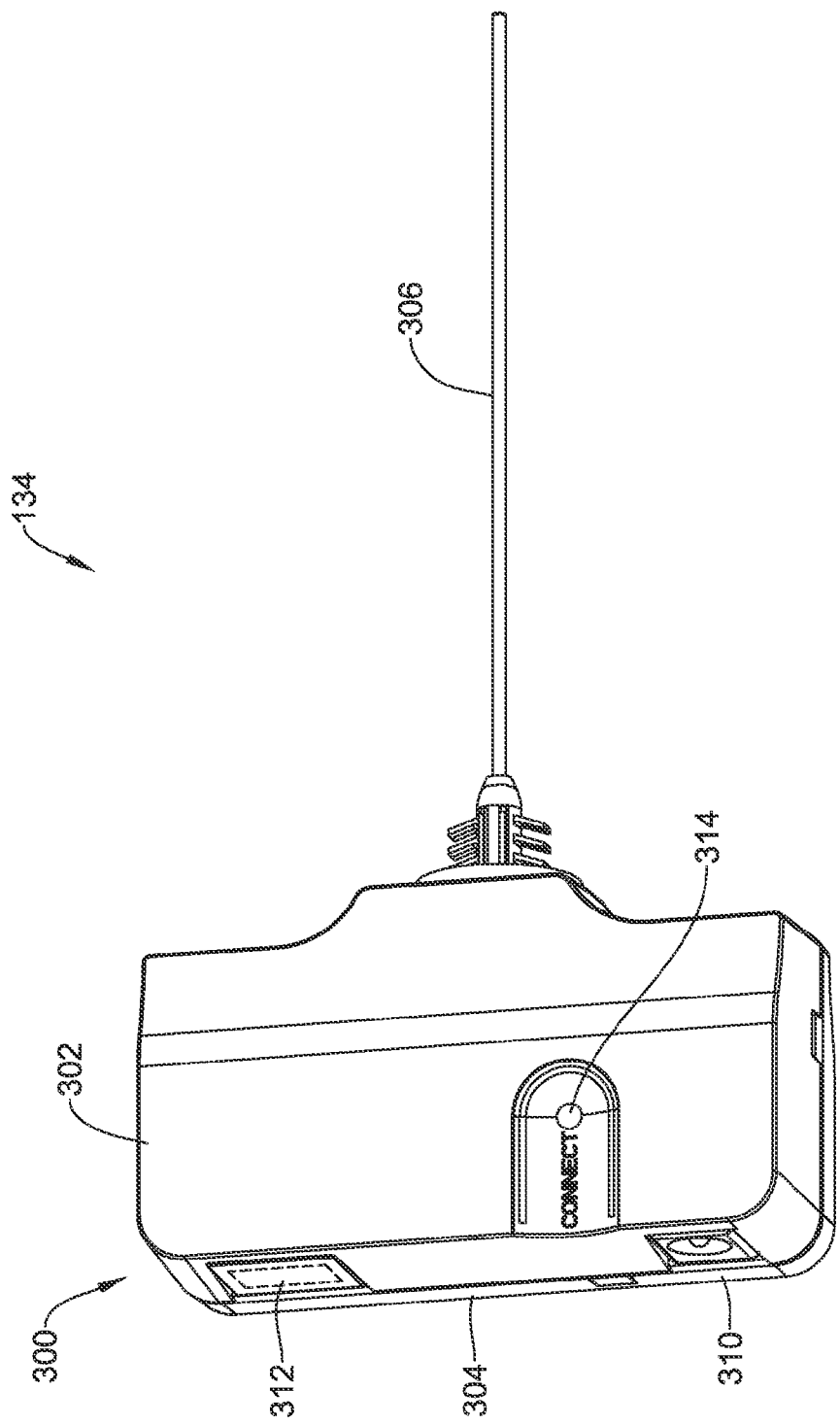
FIG. 11 is a perspective view of an illustrative control module.
Figure 12:
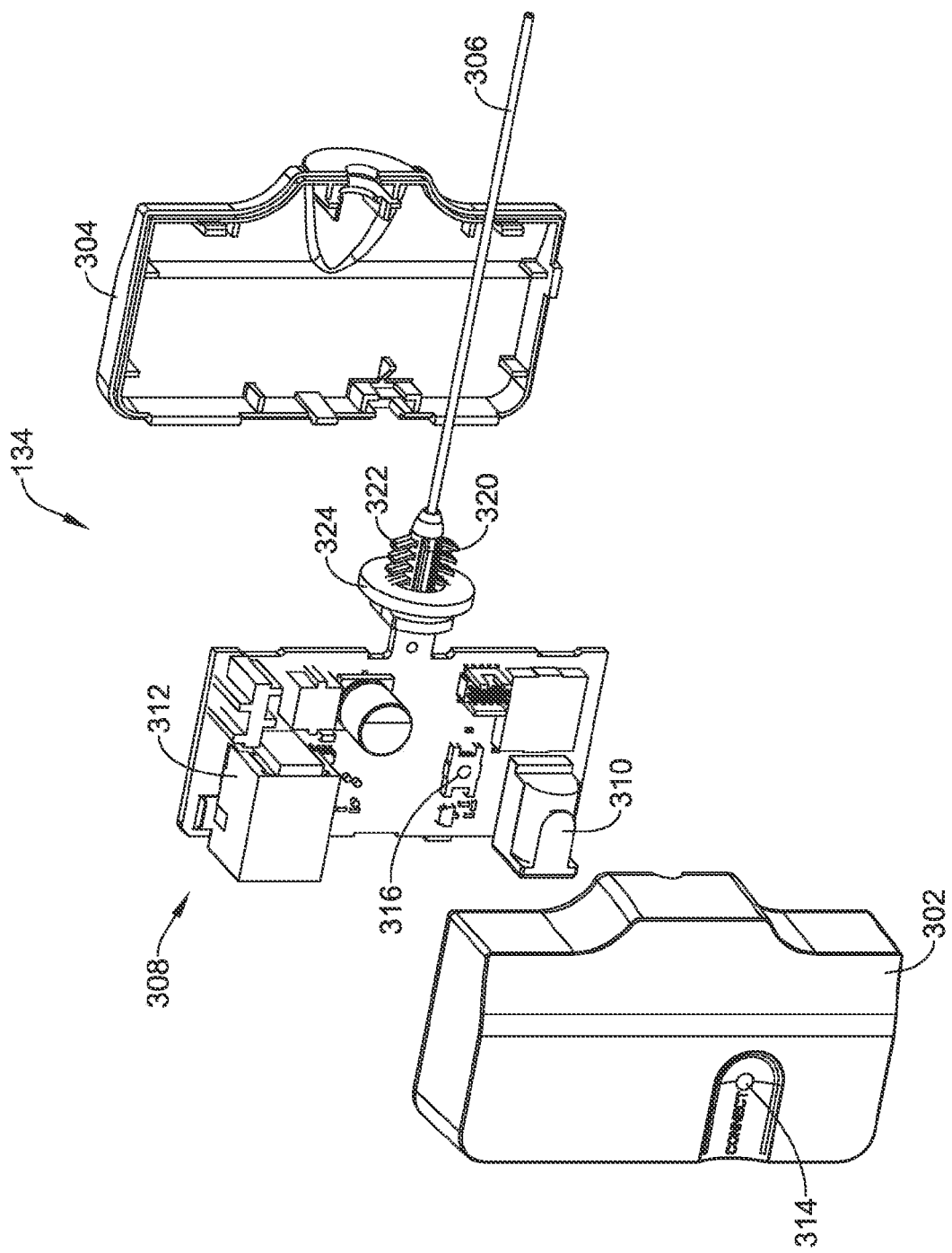
FIG. 12 is an exploded perspective view of the control module of FIG. 11.

FIG. 11 is a perspective view of the illustrative control module 134 while FIG. 12 is an exploded perspective view thereof. As seen in FIG. 11, the control module 134 may include a control module housing 300. In some cases, the control module housing 300 may include a first housing portion 302 and a second housing portion 304. The control module housing 300 may be configured to be secured to the register boot 122 and in some cases may include a curved portion in order to accommodate a corresponding curved region of the register boot 122. An antenna 306 extends from the control module housing 300 and may be configured, for example, to extend through an opening drilled through a wall of the register boot 122 such that the antenna 306 is at least partially positioned exterior to the register boot 122.

The illustrative control module 134 includes a control circuit board 308. A power jack 310 that is configured to accommodate a power supply cable providing power to the control module 134 is operably coupled to the control circuit board 308. A control jack 312 that is configured to accommodate a control cable that operably couples the control module 134 to the damper assembly 131 is operably coupled to the control circuit board 308. In some cases, as illustrated, the control module 134 includes a CONNECT button 314 that engages a switch 316 disposed on the control circuit board 308. In some cases, the CONNECT button 314 may be used in pairing the control module 134 with the thermostat 110 (FIG. 3), an EIM 114 (FIG. 3) or another control module via a wireless network connection (e.g. ZigBee, REDLINK™, Bluetooth, WiFi, IrDA, dedicated short range communication (DSRC), EnOcean, and/or any other suitable common or proprietary wireless protocol). In some cases, the CONNECT button 314 may include an LED or other light source that can be selectively illuminated when connecting the control module 134 to other devices.

As noted, the illustrative control module 134 is intended to be secured relative to the register boot 122, such as along a wall of the register boot 122, proximate a hole drilled or otherwise formed in the register boot 122 to permit the antenna 306 to extend therethrough. In some cases, the control module 134 may include one or more magnets to provide an easy way to secure the control module 134 relative to the register boot 122. In some cases, as illustrated, the control module 134 includes a mechanical locking feature 320 having a series of angled fins 322 that permit the antenna 306 (and the mechanical locking feature 320) to be inserted through a hole drilled through a wall of the register boot 122 but that resist subsequent withdrawal of the control module 134. The mechanical locking feature 320 may be formed of a resilient polymer, and may be configured to help seal the hole in the wall of the register boot 122 against air loss. In some cases, a magnet 324 may be arranged concentrically with the antenna 306. In some cases, the antenna 306 may be flexible to bend or deflect when encountering an obstacle exterior to the register boot 122.

Figure 12A:
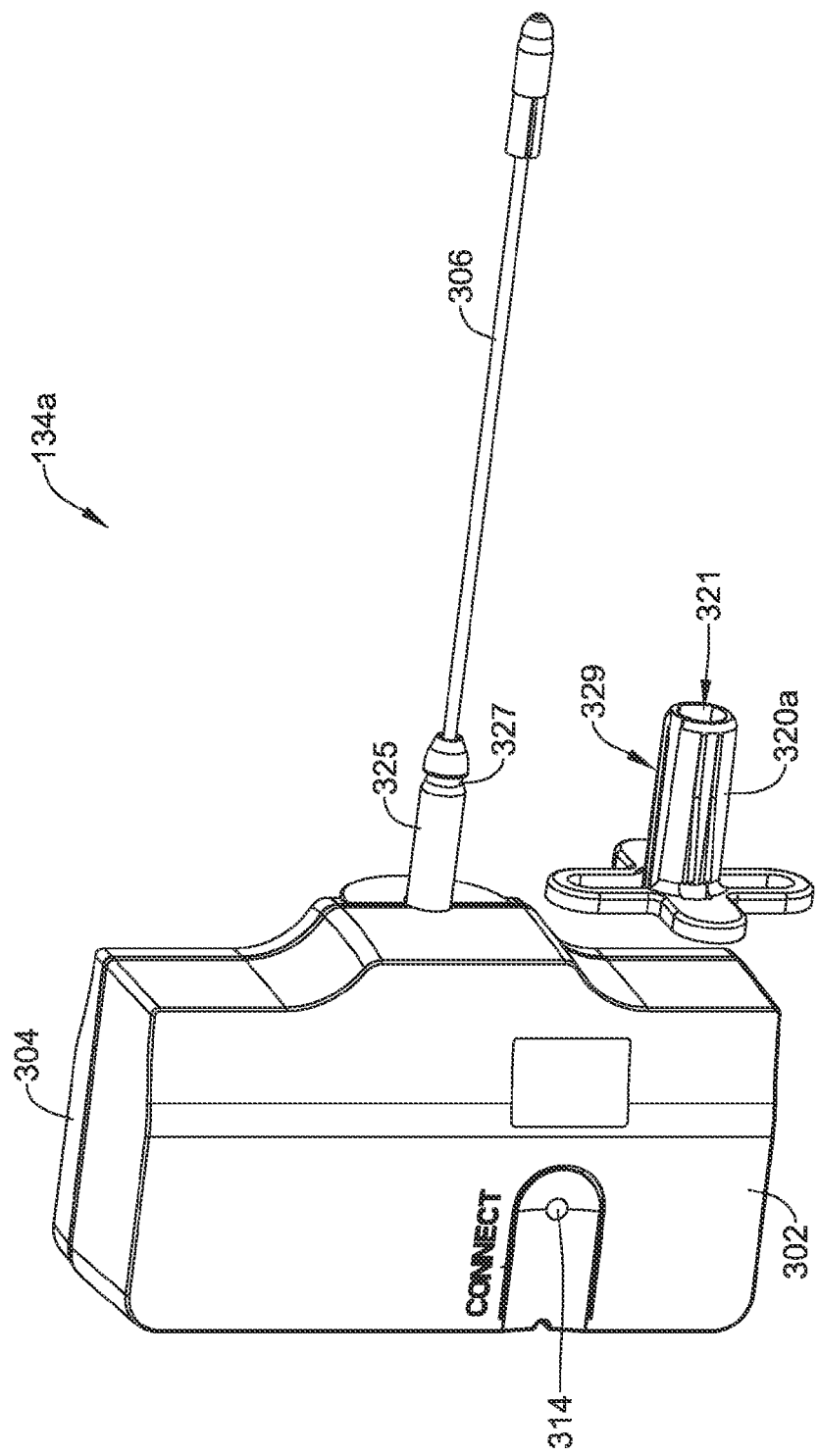
FIG. 12A is a partially exploded perspective view of an illustrative control module.

FIG. 12A is a perspective view of an illustrative control module 134*a* that is similar to the control module 134, but varies in how the control module 134*a* is secured relative to the register boot 122. A flexible grommet 320*a* may be inserted into the hole formed in the wall of the register boot 122. The antenna 306 may be inserted through a lumen 321 extending through the flexible grommet 320*a*. In some cases, as shown, the antenna 306 may include an anchoring plug 325 is secured relative to the antenna 306, and includes an annular recess 327. When the antenna 306 is inserted through the lumen 306, the anchoring plug 325 extends into the lumen 321 such that the annular recess 327 engages one or more tabs 329 formed within a side wall of the lumen 321. As a result, the anchoring plug 325, and hence the control module 134*a*, is secured in place. In some cases, the control module 134*a* may be removed from the flexible grommet 320*a* and reinstalled, if desired.

Figure 13:
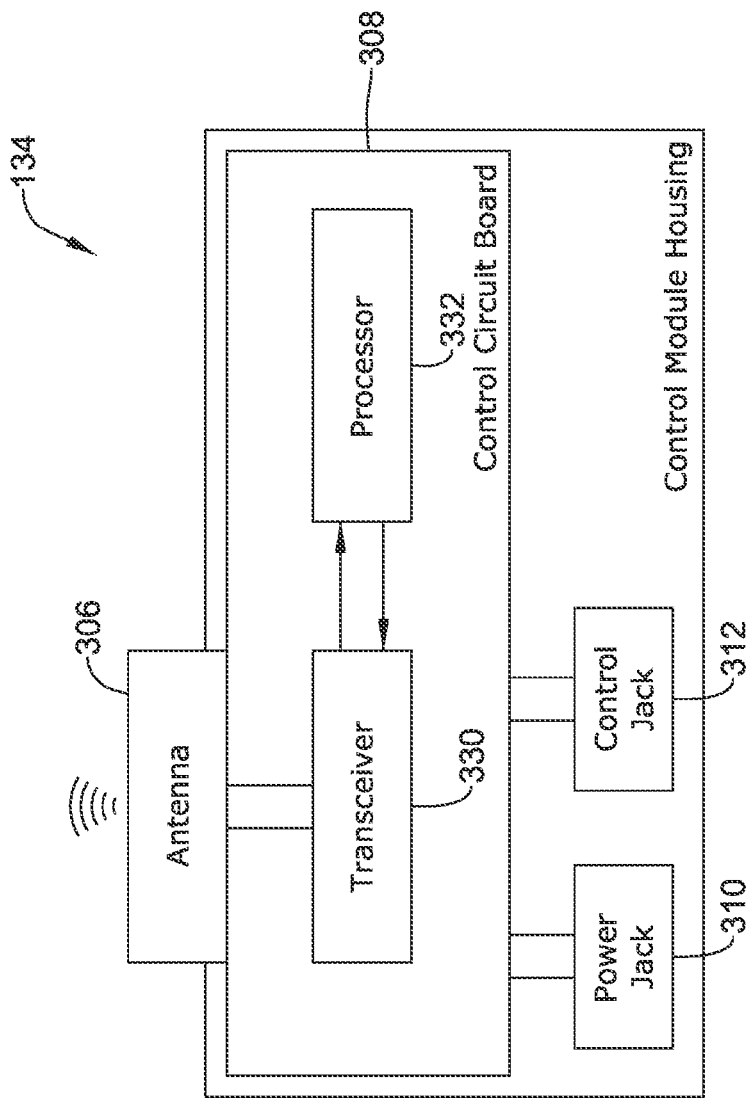
FIGS. 13, 14, 15, 16, 17 and 18 are schematic views of illustrative antenna configurations.

FIG. 13 is a schematic block diagram of the illustrative control module 134. As can be seen, the control module 134 includes on the control circuit board 308 a transceiver 330 for sending and/or receiving commands and/or information. For example, the transceiver 330 may: (1) receive instructions communicated from a remote building controller (e.g. the thermostat 110 and/or the EIM 114 of FIG. 3) such as an open command, a close command, a move to percent open command, an activate buzzer command, etc.; (2) receive sensor data from one or more remote sensors (e.g. remote temperature sensors 108 of FIG. 3), such as temperature, humidity, etc.; and/or (3) transmit certain information to a remote building controller (e.g. the thermostat 110 and/or the EIM 114 of FIG. 3) such as current damper position, battery level, signal strength, sensed noise level, sensed temperature, etc. These are just examples. The transceiver may be compatible with any suitable wireless protocol, such as ZigBee, REDLINK™, Bluetooth, WiFi, IrDA, dedicated short range communication (DSRC), EnOcean, and/or any other suitable common or proprietary wireless protocol. In some cases, the transceiver 330 has a lower power sleep mode and a higher power send/receive mode. To help reduce power consumption, the control module 134 may be configured to place the transceiver 330 in the lower power sleep mode, and only intermittently or periodically wake up the transceiver 330 to send and/or receive data before returning to the lower power sleep mode.

The illustrative control module 134 also includes on the control circuit board 308 a controller or processor for generating air damper movement commands in response to the received instructions. The air damper movement commands may be sent to the damper assembly 131 via a control cable that operably couples the control module 134 with the damper assembly 131. The control cable may connect to control jack 312 of the control module 134. The control cable may not only deliver the damper movement commands to the damper assembly 131, but may also deliver power to the damper assembly 131. In some instances, the control module 134 may not generate damper movement commands per se, but may instead simply provide power to the damper assembly 131, in either a forward or reverse polarity, in order to actuate a damper drive motor.

Figure 14:
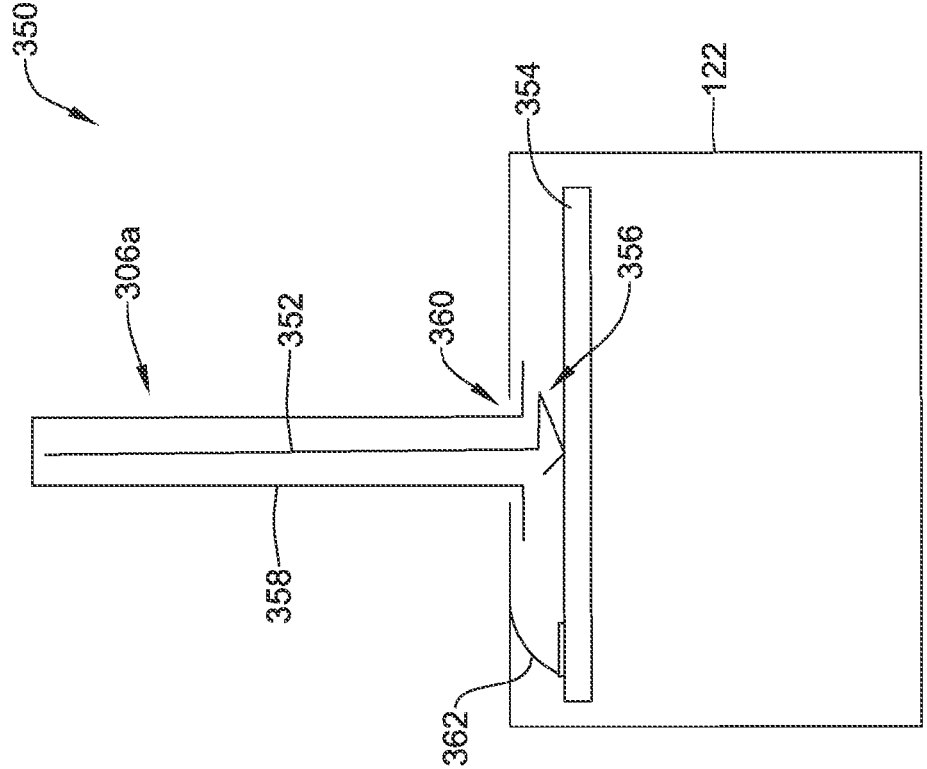

The antenna 306 may be coupled to the control circuit board 308 in a variety of ways. FIGS. 14 through 18 provide illustrative but non-limiting examples of ways in which the antenna 306 may be coupled to the control circuit board 308, as well as providing examples of antenna configuration. FIG. 14 is a schematic illustration of an assembly 350 that includes an antenna 306a. It will be appreciated that this is shown schematically, without any housing about the circuitry shown. In some cases, as illustrated, the antenna 306a includes a flexible wire 352 that is operably coupled to a radio board 354. In some cases, the radio board 354 may be considered as an example of the control circuit board 308 shown in FIGS. 12 and 13. The flexible wire 352 may be any length, although in some cases the antenna 306a may be a ⅝ wavelength of the operable center frequency, and in particular cases the flexible wire may have a length of about 8.2 centimeters (cm). This is just an example and will depend on the frequency band that is intended to be used for communication. In some instances, the radio board 354 may be a separate board or component that is operably coupled to the control circuit board 308. The flexible wire 352 may be soldered to the radio board 354. In some cases, as illustrated, the flexible wire 352 may instead be secured relative to the radio board 354 via a pressure contact 356, which in some cases may provide a faster, less expensive connection. In some cases, the radio board 354 may include a spring finger 362 that is made of an electrically conductive material such as a metal and that extends from the radio board 354 and is configured to ground the radio board 354 to the metal of the register boot 122 when the control module 134 is secured to the metal of the register boot 122.

The illustrative antenna 306a includes a polymeric boot 358 that protects the flexible wire 352 as well as electrically insulates the flexible wire 352 from the register boot 122 and other objects. It will be appreciated that the antenna 306a, by virtue of including the flexible wire 352 as well as the polymeric boot 358, is itself flexible, and is able to bend or deflect if the antenna 306a runs into an object when inserted through an aperture 360 formed in the register boot 122. In some cases, the housing (not shown) may include guides that help prevent the antenna 306a from bending far enough to interfere with the pressure contact 356.

Figure 15:
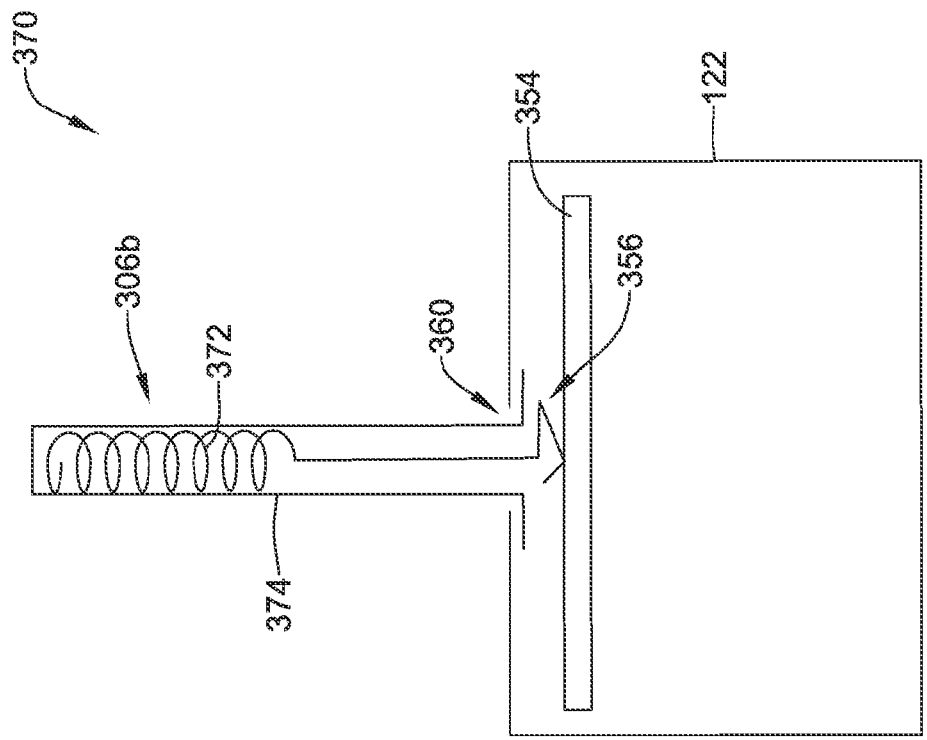

FIG. 15 is a schematic illustration of an assembly 370 that includes an antenna 306b. It will be appreciated that this is shown schematically, without any housing about the circuitry shown. In some cases, as illustrated, the antenna 306b includes a flexible coil 372 that is operably coupled to the radio board 354. In some cases, the radio board 354 may be considered as an example of the control circuit board 308 shown in FIGS. 12 and 13. The flexible coil 372 may be any suitable length. In some instances, the radio board 354 may be a separate board or component that is operably coupled to the control circuit board 308. The flexible coil 372 may be soldered to the radio board 354. In some cases, as illustrated, the flexible coil 372 may instead be secured relative to the radio board 354 via the pressure contact 356, which in some cases may provide a faster, less expensive connection. The illustrative antenna 306b includes a polymeric boot 374 that helps protects the flexible coil 372 as well as electrically insulating the flexible coil 372 from the register boot 122 and/or other objects. It will be appreciated that the antenna 306b, by virtue of including the flexible coil 372 as well as the polymeric boot 374, is itself flexible, and is able to bend or deflect if the antenna 306b runs into an object when inserted through an aperture 360 formed in the register boot 122. In some cases, the housing (not shown) may include guides that help prevent the antenna 306b from bending far enough to interfere with the pressure contact 356.

Figure 16:
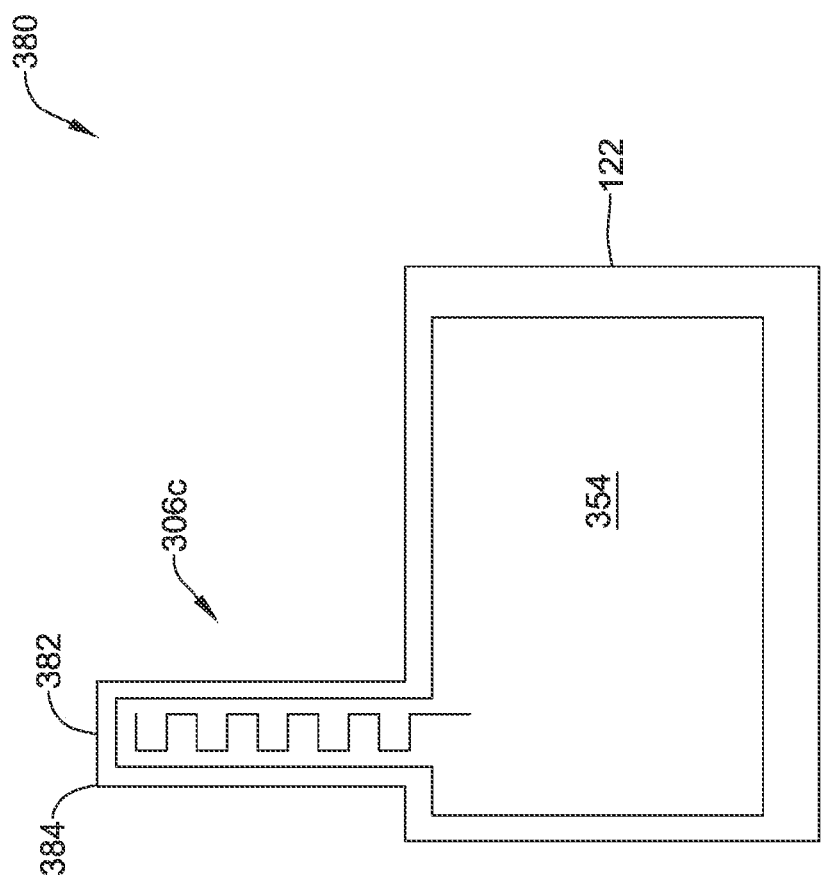

FIG. 16 is a schematic illustration of an assembly 380 that includes an antenna 306c. It will be appreciated that this is shown schematically, without any housing about the circuitry shown. In some cases, as illustrated, the antenna 306c is a PCB (printed circuit board) antenna, and may be considered as being implemented on a PCB 382. The PCB 382 may be a rigid PCB or a flex circuit. In the example shown, a polymeric boot 384 covers and protects the PCB 382. In some cases, the radio board 354 may be considered as an example of the control circuit board 308 shown in FIGS. 12 and 13, although in this case the radio board 354 has been rotated to be parallel with the antenna 306c. Use of a PCB antenna may mean that a slot needs to be cut into the register boot 122, rather than a round hole. In some cases, the slot may be about 1 cm in length, although this is just an example.

Figure 17:
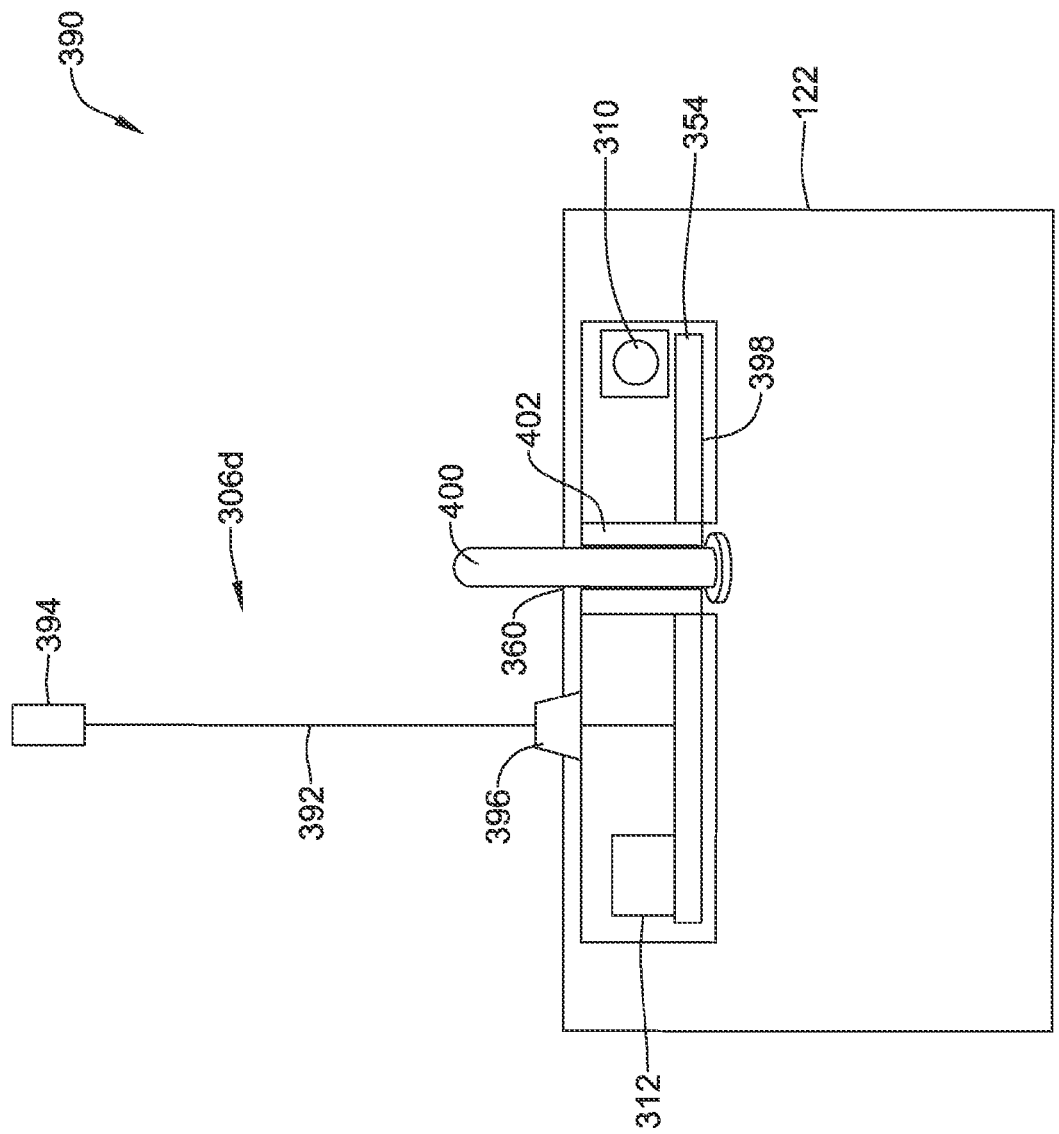

FIG. 17 is a schematic illustration of an assembly 390 that includes an antenna 306d. It will be appreciated that this is shown schematically, without any housing about the circuitry shown. In some cases, as illustrated, the antenna 306d includes a flexible wire 392 that is operably coupled to the radio board 354. In some cases, the radio board 354 may be considered as an example of the control circuit board 308 shown in FIGS. 12 and 13, and as seen includes the power jack 310 and the control jack 312. In some instances, the radio board 354 may be a separate board or component that is operably coupled to the control circuit board 308. The flexible wire 392 may be soldered to the radio board 354. The illustrative antenna 306d includes an electrically insulating member 394 at a terminal end thereof, as well as an electrically insulating member 396 that also seals against air flow where the flexible wire 392 exits the register boot 122. In some cases, the antenna 306d may include an electrically insulating layer or tube that is disposed along the length of the flexible wire 392 to electrically isolate the flexible wire 392 from the register boot 122 and/or other objects.

In some cases, as illustrated, the radio board 354 includes a ground plane 398. The ground plane 398 may be electrically coupled. i.e., grounded, to the metal register boot 122 via a screw 400 that passes through the ground plane 398 and into a hole 360 that is formed in the metal register boot 122. The screw 400 also serves to secure the control module 134 in position relative to the metal register boot 122. In some cases, there is an enclosure standoff 402 that helps to support the screw 400. It will be appreciated that the antenna 306d is flexible, and thus is able to bend or deflect if the antenna 306d runs into an object when inserted through the aperture 360 formed in the register boot 122.

Figure 18:
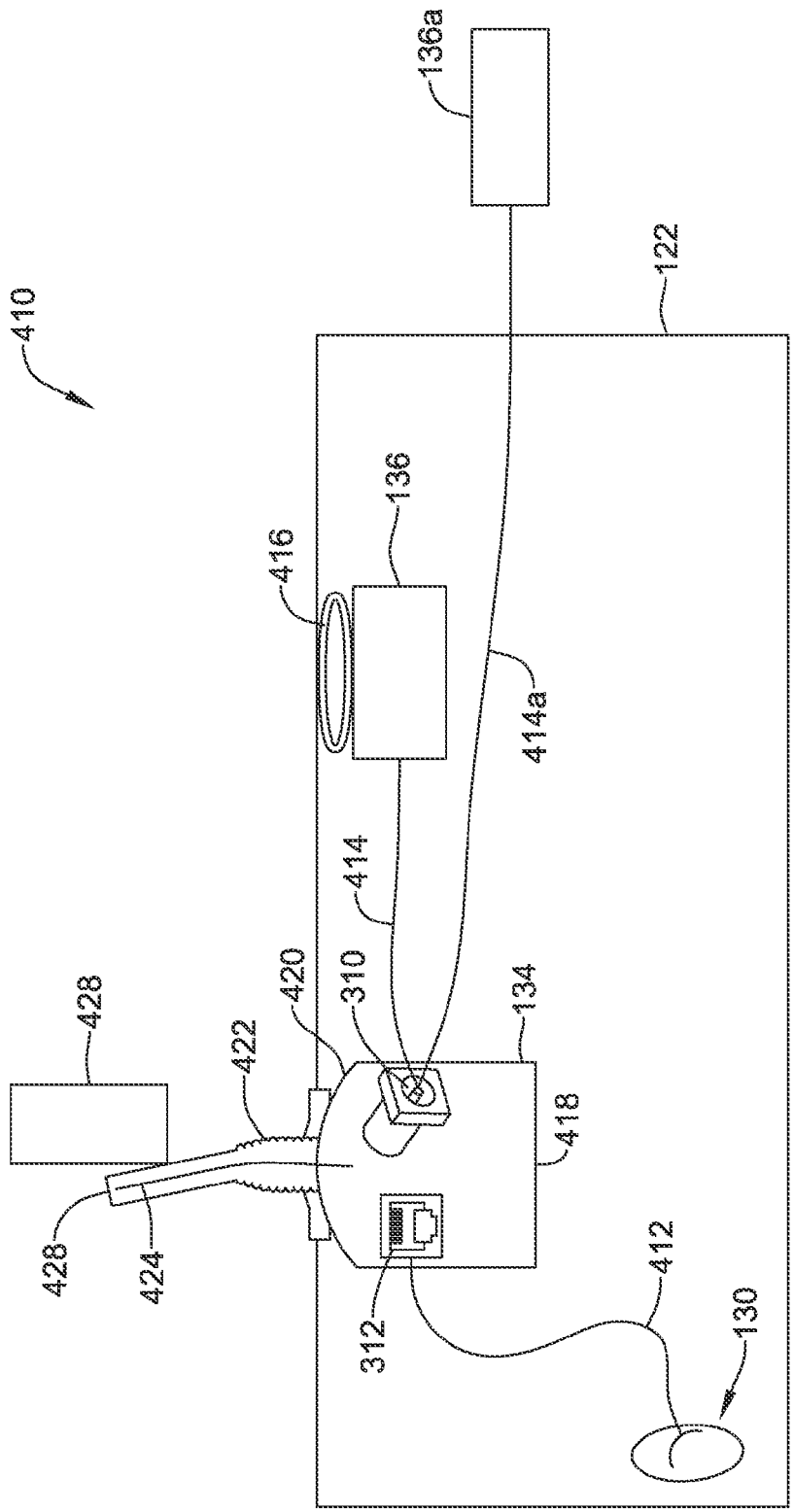

FIG. 18 is a schematic illustration of an assembly 410 that includes the control module 134 and the power module 136 disposed within the register boot 122. As illustrated, a control cable 412 extends between the damper assembly 130 (or the damper assembly 131) and a control jack 312 of the control module 134. Also, a power cable 414 extends between a power module 136 and a power jack 310 of the control module 134. In some cases, as illustrated, the power module 136 may be held in place on a wall of the register boot 122 via a magnet 416. Alternatively, a power cable 414a may extends between a plug-in transformer 136a and the power jack 310 of the control module 134. The plug-in transformer 136a may be used, for example, if there is a conveniently located electrical receptacle sufficiently near the particular register vent.

The illustrative control module 134 includes a housing 418 that has a curved surface 420 for potential installation on a curved surface such as a curved register boot 122. A hollow screw 422 may be used to electrically ground and physically secure the control module 134 to the metal register boot 122 while securing the control module 134 to the register boot 122. When so provided, the hollow screw 422 may be configured to accommodate an antenna wire 424 extending outwardly from the control module 134 and through the hollow screw 422. A sheath 426 may extend over the antenna wire 424 and serves to electrically insulate the antenna wire 424 from the register boot 122 and/or other objects. In some cases, the antenna wire 424 and the sheath 426 are sufficiently flexible to bend or deflect to accommodate obstacles, such as but not limited to a joist or board 428 that is adjacent the register boot 122.

Figure 19:
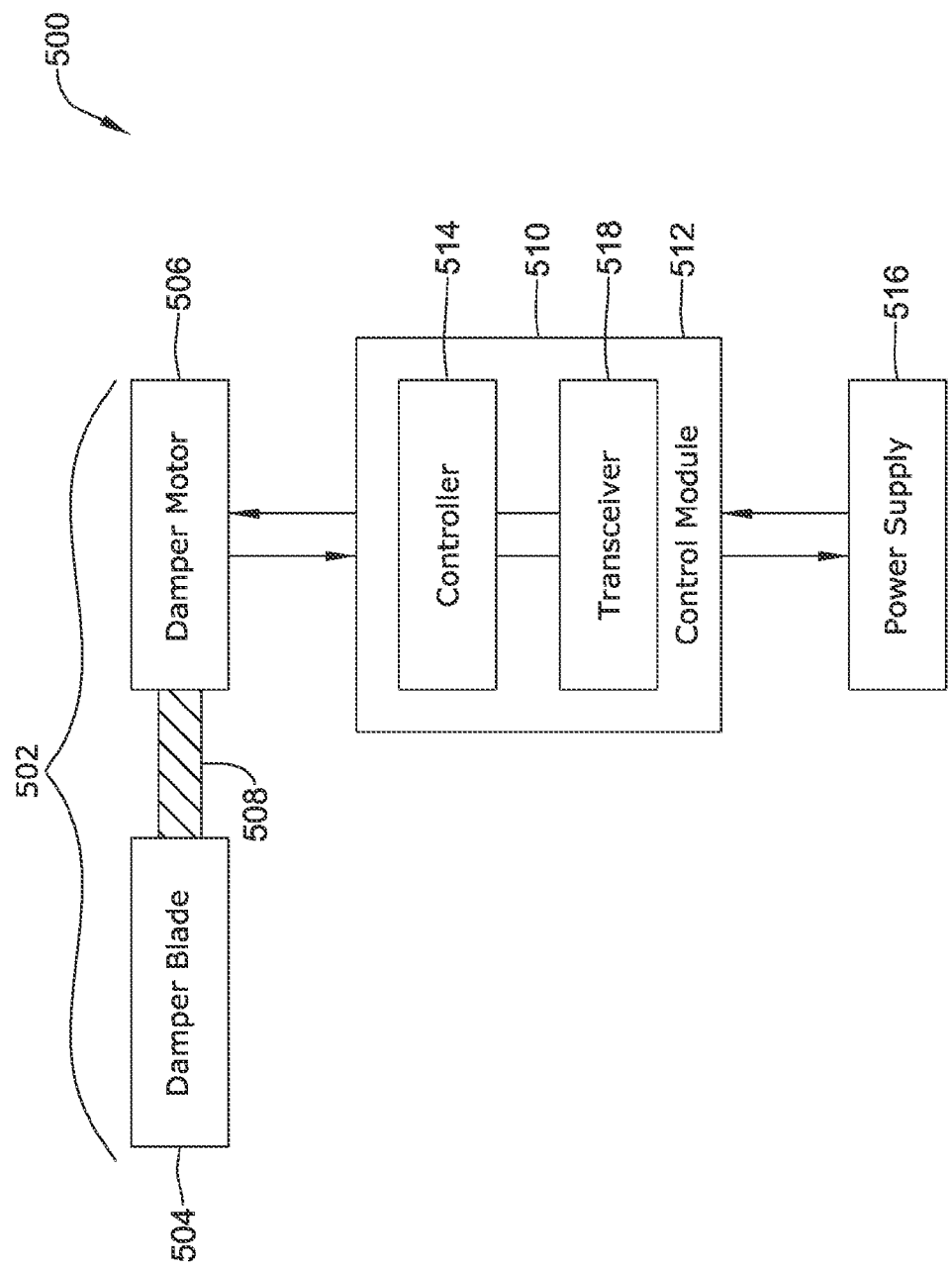
FIG. 19 is a schematic block diagram of an illustrative damper assembly.

FIG. 19 is a schematic block diagram of a damper system 500 that may be configured for installation in an existing duct system of a building. The illustrative damper system 500 may be installed in a duct that is providing conditioned air through a register boot to a register vent. The illustrative damper system 500 includes a damper assembly 502 that is configured to be disposed within the duct (such as the duct 120). The damper assembly 502 includes a damper blade 504 that is movable between a closed end position and an open end position. In some cases, as illustrated, the damper blade 504 is actuated via a damper motor 506 turning a shaft 508 that also forms a part of the damper assembly 502. A control module 510, which may be considered as an example of the control module 134, is configured to be operably coupled to the damper assembly 502. The control module 510 includes a control module housing 512 and a controller 514 that is disposed within the control module housing 512 and that regulates operation of the damper assembly 502. In some cases, the control module housing 512 may be configured to be secured remote from the damper assembly 502 at an accessible location such as behind the register vent and within the register boot 122.

A power supply 516 may be operably coupled to the control module 510. In some cases, the power supply 516 may be disposed within a power supply housing that is remote from the control module 510, and is operably coupled to the control module 510 via a power cable. The power supply housing may, for example, be configured to be secured to the register boot 122 when the damper assembly 502 is deployed in the duct 120. In some cases, the power supply 516 may include one or more non-rechargeable batteries. In some cases, the power supply 516 may be part of the control module 510 and may be contained within the control module housing 512.

In some cases, the control module 510 includes a transceiver 518 that is disposed within the control module housing 512 and that is operably coupled with the controller 514. The controller 514 may be configured to, for example, monitor a remaining energy level of the power supply 516, and to transmit a first low battery message via the transceiver 518 when the remaining energy level drops to a first energy threshold. In some instances, the controller 514 may monitor voltage as an indication of remaining energy. In some cases, the controller 514 may transmit via the transceiver 518 a low battery message to a remote device such as the thermostat 110 (FIG. 3). When the remaining energy level drops to a second energy threshold that is lower than the first energy threshold, the controller 514 may be configured to instruct the damper assembly 502 to move to a predetermined position and to transmit a second low battery message via the transceiver 518. In some cases, if the remaining energy level drops to a third energy threshold that is lower than the second power threshold, the controller 514 may be further configured to conserve the remaining battery power by no longer transmitting a low battery message via the transceiver 518 and keep the damper assembly 502 at the predetermined position. In some cases, if the remaining energy level drops to a third energy threshold lower than the second energy threshold, the controller 514 may also stop listening for transmitted messages. In some cases, the third energy threshold may be set at or above an energy level at which point an alkaline battery may begin to offgas. This is just an example.

In some cases, the controller 514 may determine a default damper position that is a calculated value that is based at least in part upon a history of requested damper positions. For example, if a particular damper has been closed for thirty days, it is likely appropriate to leave it closed when the corresponding power supply becomes depleted. In some cases, the controller 514 may look at seasonal data, and/or may take the calendar into account. For example, in the summer, a damper system 500 that is located upstairs may default to an open position in the summer but may default to a closed position in the winter. This is merely illustrative, as a number of different possibilities are possible. In some cases, when the remaining energy level drops to the second energy threshold, the controller 514 determines the predetermined position in accordance with a history of damper positions over a period of time ending when the energy level dropped to or below the second energy threshold. In other words, the predetermined position may be based upon a most likely or most common previous damper position for the particular damper.

In some cases, the controller 514 may make these calculations and determinations. In some instances, these calculations may instead be made at the thermostat 110 (FIG. 3), or even by a cloud-based server. When so provided, rather than defaulting to the open end position, the controller 514 may instruct the damper assembly 502 to move to the calculated default damper position when the remaining energy level of the power supply 516 drops to the second power threshold. In some cases, the controller 514 may also be configured to provide a beep or other noise to help an individual locate the particular damper system 500 having a low battery situation, using a noise enunciator or a speaker, for example. In some instances, the controller 514 may do so in response to a request from an application running on a mobile device such as but not limited to a smartphone, for example.

In some cases, the controller 514 may be configured to receive one or more control commands from a remote building controller via the transceiver 518, and to regulate operation of the damper assembly 502 based at least in part on the one or more control commands. In some instances, the controller 514 may be configured to regulate operation of the damper assembly 502 by controlling a position of the damper blade 504 of the damper assembly 502, and to change the position of the damper blade 504 of the damper assembly 502 less frequently when the remaining energy level is less than the first power threshold than when the remaining energy level is greater than the first power threshold in order to reduce power consumption by the damper assembly 502.

Figure 20:
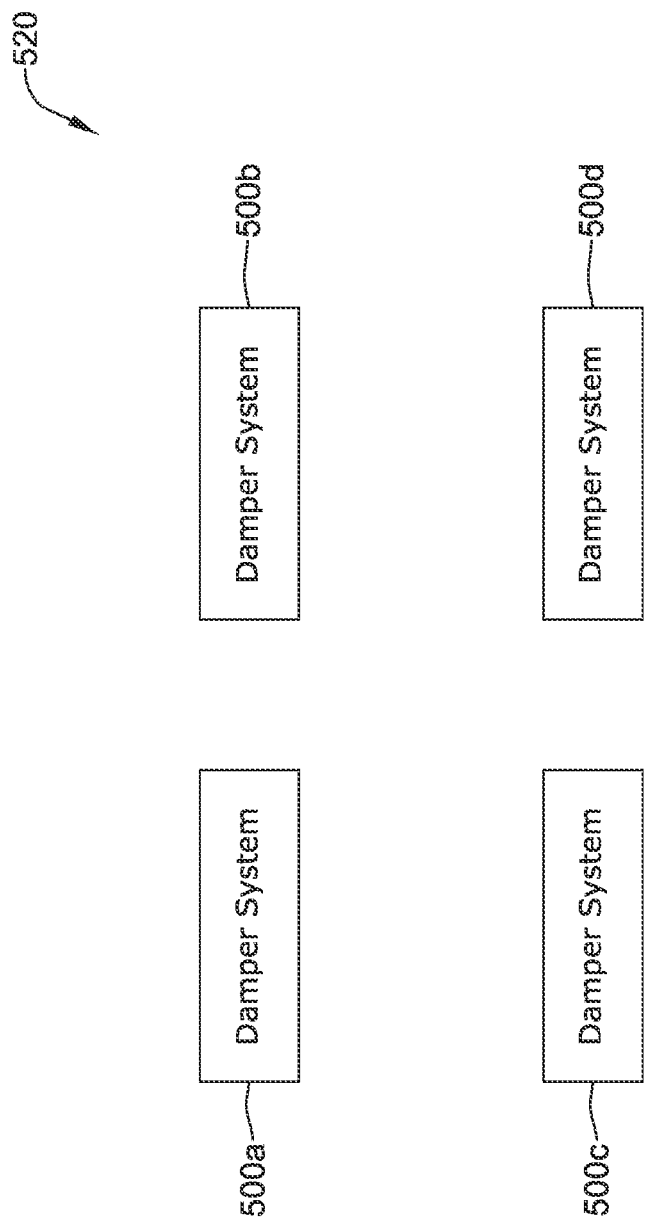
FIG. 20 is a schematic block diagram of an illustrative retrofit damper system.

In some cases, there may be a plurality of individual damper systems 500 installed in a single building, and in some cases the individual damper systems 500 may cooperate in trying to compensate for a particular damper system 500 having an extremely low power supply, for example, or may utilize a particular damper system 500 having a relatively higher remaining power supply to take over more of the responsibility for maintaining thermal control within a zone or within the building. FIG. 20 shows a retrofit zoning system 520 configured for use in zoning an HVAC system of a building. The illustrative HVAC system includes a network of ducts providing conditioned air to each of a plurality of register vents. As can be seen, the retrofit zoning system 520 includes a plurality of damper systems 500a, 500b, 500c, 500d. While a total of four damper systems are shown, it will be appreciated that this is merely illustrative, as any number of damper systems may be included. Each of the damper systems 500a, 500b, 500c, 500d may be considered as including the structure and functionality of the damper system 500 shown in FIG. 19.

When one of the controllers 514 detect a remaining energy level that has dropped to or below a first energy threshold, that controller 514 is configured to transmit a first low battery message via the transceiver 518 operably coupled to that controller 514. In some cases, when one of the controllers 514 detect a remaining energy level that has dropped to or below a second energy threshold lower than the first energy threshold, that controller 514 may be configured to instruct the corresponding damper assembly 502 to move to the predetermined position and to transmit a second low battery message via the corresponding transceiver 518.

When one of the controllers 514 detects a remaining energy level that has dropped to or below a third energy threshold lower than the second power threshold, that controller 514 may be configured to stop transmitting a low battery message via the corresponding transceiver 518 and to go into a low power state. It may be desirable to preserve the remaining battery level of the battery above a battery leakage threshold for an extended period of time. Once the battery level falls below the battery leakage level, the battery may begin to leak and possibly cause damage to the power supply 516. For example, the third energy threshold may be set at an energy level that is still above the point at which an alkaline battery may start to offgas.

In some cases, when one of the controllers 514 detects a remaining energy level that has dropped to or below a first power threshold, that controller 514 may be configured to change the position of the damper blade 504 of the corresponding damper assembly 502 less frequently than when the remaining energy level is detected to be above the first energy threshold in order to reduce power consumption by the damper assembly 502. In some cases, if one of the controllers 514 detects that the remaining energy level of the corresponding power supply 516 has dropped to or below a first energy threshold, that controller may transmit a first low battery message and the retrofit zoning system may be configured to make positional changes to one or more of the other damper blades 504 in order to reduce a need for at least some positional changes of the damper blade 504 corresponding to the damper assembly 502 having the low battery condition, thereby helping to conserve remaining power in that particular power supply 516.

In some cases, when one of the controllers 514 that is assigned to a first HVAC zone detects a remaining energy level that has dropped to or below a first energy threshold, the retrofit zoning system may attempt to control the first HVAC zone by regulating the operation of one or more of the other damper assemblies 500a, 500b, 500c, 500d that have a remaining energy level that is above the first energy threshold in order to reduce power consumption by the particular damper assembly 500a, 500b, 500c, 500d with a low battery condition. In some case, the retrofit zoning system may attempt to control the first HVAC zone by more aggressively regulating the operation of one or more other of the plurality of damper systems 500a, 500b, 500c, 500d that are also assigned to the first HVAC zone and that have a remaining energy level that is above the first power threshold. Put another way, the retrofit zoning system may attempt to control the first HVAC zone by expending more energy adjusting the operation of one or more of the other of the plurality of damper systems 500a, 500b, 500c, 500d that are also assigned to the first HVAC zone.

Figure 21:
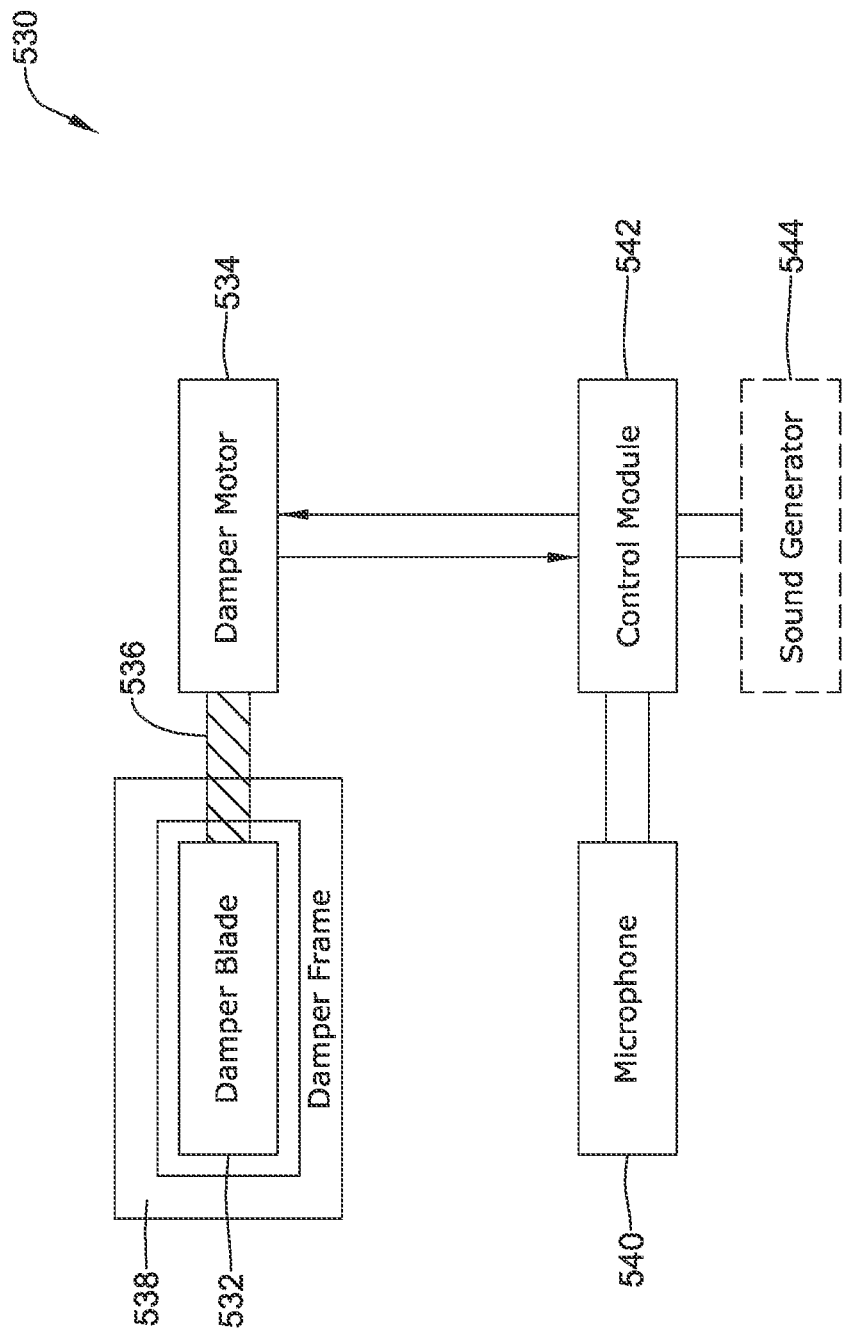
FIG. 21 is a schematic block diagram of an illustrative damper assembly.

FIG. 21 is a schematic block diagram of a damper assembly 530 that is configured for placement within a duct of an existing ductwork system, wherein the duct supplies conditioned air through a register boot to a register vent within a room. The illustrative damper assembly 530 includes a damper blade 532 that is movable between a closed end position in which air moving through the duct is restricted from flowing past the damper blade 532 and through the register vent, and an open end position in which air moving through the duct is less restricted from flowing past the damper blade 532 and through the register vent. A damper motor 534 is operably coupled to the damper blade 532 via a shaft 536, and the damper motor 534 is configured to move the damper blade 532 between the closed end position and the open end position.

In some cases, the damper assembly 530 includes a damper frame 538, where the damper blade 532 is rotatably secured relative to the damper frame 538. When in the closed end position, the damper blade 532 may be considered as having a contact region (such as the damper blade periphery 198 referenced in FIG. 6) that engages the damper frame 538. When in the open end position, the contact region of the damper blade 532 is rotated away from the damper frame 538. In some cases, the damper blade 532 and the damper frame 538 are both plastic, and while not illustrated in FIG. 21, the damper assembly 530 may further include a flexible member extending outward from the damper frame 538 to form a seal with at least part of an inside surface of the duct. The resilient seal 144 discussed above may be considered as being an example of such a flexible member. In some cases, the damper assembly 530 may include one or more bypass channels that permit a small amount of air to flow past the damper blade 532 even when the damper blade 532 is closed. When provided, the one or more bypass channels may be provided in the flexible member, the damper frame, the damper blade or some combination of these components.

In some cases, the damper assembly 530 may include a microphone 540 for providing an output signal that is representative of sounds sensed by the microphone 540. A control module 542, which may be considered as being an example of the control module 134, is operably coupled to the damper motor 534 and to the microphone 540. In some cases, the control module 542 may be configured to control operation of the damper motor 534 based at least in part on the output signal provided by the microphone 540. In some cases, for example, the control module 542 may be configured to control operation of the damper motor 534 to move the damper blade 532 to a more open position when a whistle sound is sensed by the microphone 540. In some cases, opening the damper blade 532 may reduce and/or eliminate noises otherwise made by air flowing past a partially closed damper blade 532, for example.

In some instance, the control module 542 may be configured to control operation of the damper motor 534 to reduce a frequency of positional changes to the damper blade 532 when a sound indicating occupancy of the corresponding room/zone is sensed by the microphone 540. Reducing a number of times the damper blade 532 is moved, particularly when the room is occupied, can translate into less noticeable noise for occupants in the room. In some instances, the control module 543 may be configured to store an occupancy schedule that includes periods of occupancy and periods of non-occupancy. The occupancy schedule may be built based at least in part on a history of sounds sensed by the microphone 540. In some cases, the control module 542 may be configured to control operation of the damper motor 534 in a first mode that reduces noise caused by the damper assembly 530 during the periods of occupancy of the occupancy schedule, and to control operation of the damper motor 534 in a second mode during the periods of non-occupancy. In some cases, the control module 542 may be configured to store a sleep schedule that defines one or more sleep periods, and the control module 542 may be configured to control operation of the damper motor 534 to reduce noise caused at least in part by the damper assembly 530 during the one or more sleep periods, regardless of any sounds detected or not detected by the microphone 540.

In some cases, the control module 542 may not include the microphone 540, and the control module 542 may be configured to make less noise during periods of time in which occupants are expected to be asleep, and may be configured to make more noise during periods of time in which occupants are expected to be awake, or even expected to be out of the building. In some cases, when in the first mode, the control module 542 may operate the damper motor 534 to move the damper blade 532 at a slower speed in order to reduce noise generation caused by the damper motor 534, and in the second mode, the control module 542 may operate the damper motor 534 to rotate the damper blade 532 at a faster speed in order to reduce drive time and possibly reduce power consumption. In some cases, when in the first mode, the control module 542 may operate the damper motor 534 less frequently, and in the second mode, the control module 542 may operate the damper motor 534 more frequently.

In some cases, the damper assembly 530 may also include a sound generator 544 that is operably coupled to the control module 542. In some instances, the control module 542 may be configured to cause the sound generator 544 to provide active noise cancellation for at least some of the sounds sensed by the microphone 540. The control module 542 may also be configured to provide white noise via the sound generator 544. In some cases, the control module 542 may play music, or relaxing sounds, via the sound generator 544. These are just examples. In some cases, the control module 542 may provide a beep or buzzer sound via the sound generator 544 to help a user locate the damper assembly 530 when the batteries need to be replaced. In some instances, the control module 542 may provide a beep or buzzer sound, or perhaps illuminate an LED in the CONNECT button 313 (FIG. 11) in order to identify a location of the damper assembly 530 when pairing with remote sensors, in order to confirm that the damper assembly 530 is paired with the correct remote sensor, and that the one or more HVAC controller(s) 18 knows the particular location of the damper assembly 530. In some cases, the sound generator 544 may be a speaker. In some instances, the sound generator 544 may instead be a piezoelectric device or other device configured to make audible sounds.

Figure 22:
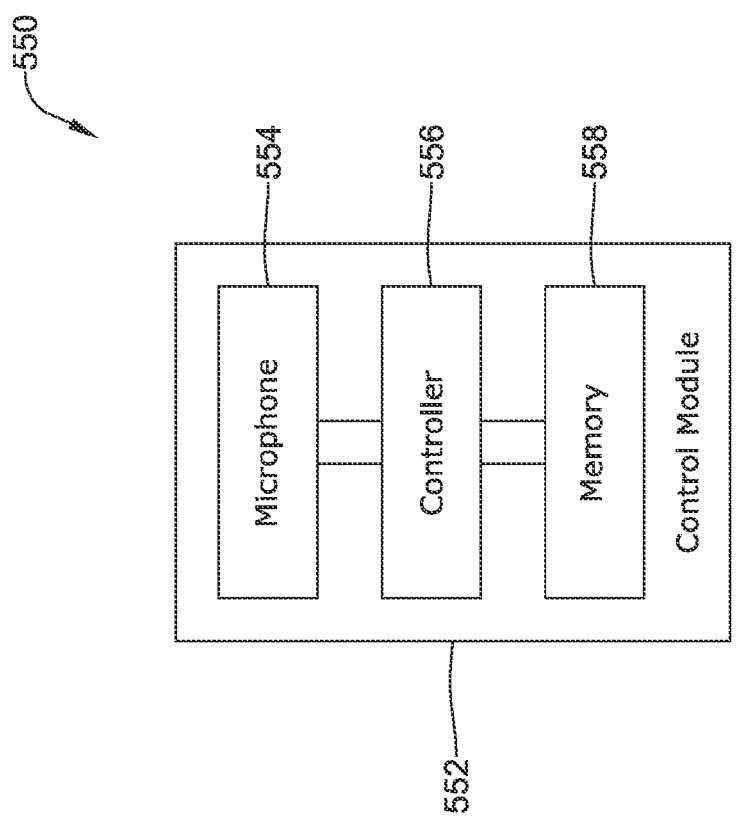
FIG. 22 is a schematic block diagram of an illustrative control module.

FIG. 22 is a schematic block diagram of an illustrative control module 550. The control module 550 may be considered as being an example of the control module 134, and may be configured to be operably coupled to a damper assembly 130, 131 that is placed within a duct 120 that supplies conditioned air through a register boot 122 to a register vent within a room. The illustrative control module 550 includes a control module housing 552 and a microphone 554 for providing an output signal that is representative of sounds sensed by the microphone 554. A controller 556 is housed by the control module housing 552 and is operably coupled to the microphone 554. In some cases, the controller 556 may be configured to control operation of the damper assembly. In some instances, the controller 556 may be configured to adjust operation of the damper assembly 130, 131 to reduce audible sounds sensed by the microphone 554 that are caused at least in part by the damper assembly 130, 131.

In some instances, the control module 550 may include a memory 558 that is housed by the control module housing 552 and that is operably coupled to the controller 556. The memory 558 may store a schedule indicating when the room is expected to be occupied, and wherein when the room is expected to be occupied, the controller 556 may be configured to control the damper assembly 130, 131 in a first mode that attempts to reduce audible sounds sensed by the microphone 554 caused at least in part by the damper assembly 130, 131, and when the room is expected to be unoccupied, the controller 556 may be configured to control the damper assembly 130, 131 in a second mode that is different from the first mode.

The control module 550 may be configured to detect sounds that have an amplitude that is above an amplitude threshold and/or a frequency within a predetermined frequency range, and when detected, the controller 556 may be configured to make adjustments to the operation of the damper assembly 130, 131 to reduce the detected sounds. In some cases, the controller 556 may be further configured to operate the damper assembly 130, 131 in a first mode when the room is expected to be occupied and in a second mode when the room is expected to be unoccupied.

Figure 23:
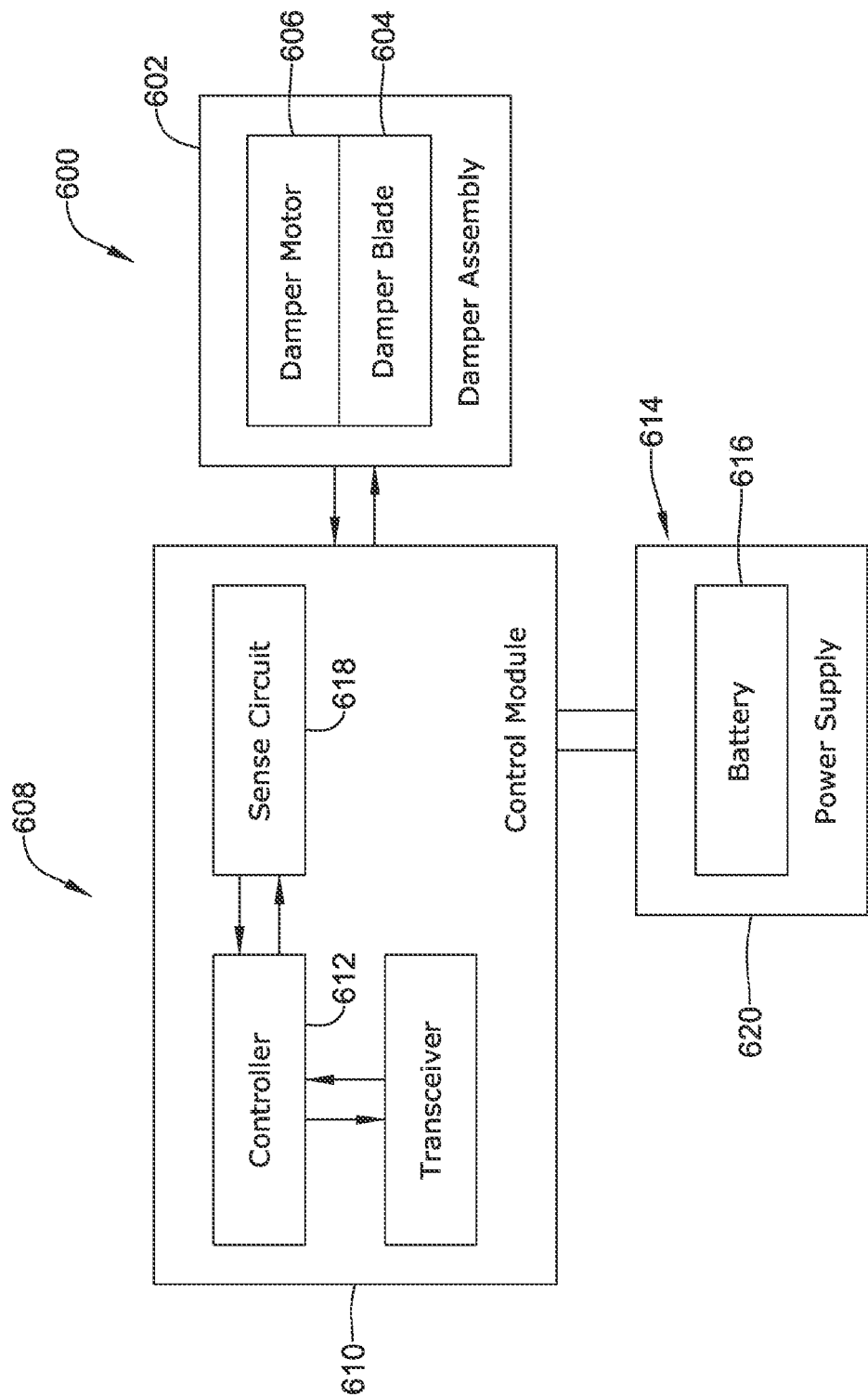
FIG. 23 is a schematic block diagram of an illustrative damper assembly.

FIG. 23 is a schematic block diagram of a retrofit damper system 600 that is configured for installation in existing ductwork including a duct 120 supplying conditioned air through a register boot 122 to a register vent. The retrofit damper system includes a damper assembly 602 that is configured to be disposed within the duct 120. The damper assembly 602 includes a damper blade 604 that is movable between a closed end position and an open end position. An electric damper motor 606 may be configured to drive the damper blade 604 to a desired position that is at or between the closed end position and the open end position.

A control module 608 is configured to be operably coupled to the damper assembly 602 and includes a control module housing 610 and a controller 612 that is disposed within the control module housing 610. The control module housing 610 may be configured to be secured remote from the damper assembly 602 at a position within the register boot 122 and accessible with the register vent removed. The controller 612 may be configured to regulate operation of the electric damper motor 606, and outputs a drive signal that causes the electric damper motor 606 to drive the damper blade 604 to a desired position. A power supply 614 including one or more batteries 616 is operably coupled to the controller 612. In some cases, the power supply 614 includes a power supply housing 620 that is configured to be secured remote from the damper assembly 602 at a position within the register boot 122 and accessible with the register vent removed.

In some cases, in order to determine a relative position of the damper blade 604, the controller 612 may be configured to create a plurality of interruptions in the drive signal while driving the damper blade 60 toward the desired position and to activate a sense circuit 618 (part of the control module 608) in order to sense a back EMF signal generated by the electric damper motor 606 during each of the plurality of interruptions in the drive signal. Each of the back EMF signals representative of the angular velocity of the electric damper motor 606 during the corresponding interruption. The controller 612 may be configured to estimate a current position of the damper blade 604 based at least in part on the back EMF signals sensed during the plurality of interruptions. In some cases, the estimate includes integrating the back EMF signals that are representative of velocity. By integrating velocity over time, an estimate of position can be obtained. The estimated position may be calibrated to a known position when the damper blade 604 is driven to an end stop position. In some cases, the controller 612 may periodically drive the damper blade 604 to an end stop position to re-calibrate the estimated damper position.

In some cases, the controller 612 may be configured to determine that the current position of the damper blade 604 corresponds to the closed end position (e.g. an end stop position) when the drive signal is driving the damper blade 604 toward the closed end position and one or more of the back EMF signals indicate that the angular velocity of the electric damper motor 606 is zero. When the controller 612 determines that the current position of the damper blade 604 corresponds to the closed end position, the controller 612 may reset the estimated current position to the closed end position. In some cases, the controller 612 may be configured to determine that the current position of the damper blade 604 corresponds to the open end position when the drive signal is driving the damper blade 604 toward the open end position and one or more of the back EMF signals indicate that the angular velocity of the electric damper motor 606 is zero. In some cases, when the controller 612 determines that the current position of the damper blade 604 corresponds to the open end position, the controller 612 may reset the estimated current position to the open end position. In some cases, the controller 612 may utilize an H-bridge switch in switching the drive signal between a first polarity for driving the electric damper motor 606 in a first rotational direction toward the closed end position, and a second opposing polarity for driving the electric damper motor 606 in a second opposite rotational direction toward the open end position.

In some cases, when the controller 612 determines that the current position of the damper blade corresponds to the closed end position, the controller 612 may reset the estimated current position to the closed end position. In some instances, the controller 612 is configured to determine that the current position of the damper blade corresponds to the open end position when the drive signal was driving the damper blade toward the open end position and the controller 612 determines that the damper has stopped moving based on at least one sensed back EMF signal.

In some instances, the controller 612 may be further configured to determine that the current position of the damper blade corresponds to the closed end position when the drive signal was driving the damper blade toward the closed end position and the controller 612 determines that the damper has stopped moving based on at least one sensed back EMF signal. When the controller 612 determines that the current position of the damper blade corresponds to the closed end position, the controller 612 may reset the estimated current position to the closed end position. In some cases, the controller 612 may be configured to determine that the current position of the damper blade corresponds to the open end position when the drive signal was driving the damper blade toward the open end position and the controller 612 determines that the damper has stopped moving based on at least one sensed back EMF signal.

The controller 612 may be configured to determine the estimated current position of the damper blade based at least in part on integrating a plurality of back EMF signals over time periods during which the damper blade is being driven towards desired positions and adding an integrated result multiplied by a velocity constant to the reset estimated position. In some cases, the controller 612 may be configured to receive a requested position and to drive the damper blade to the requested position by driving the damper blade towards the requested position while periodically estimating the position and stopping driving the damper blade when the absolute value of the estimated position minus the requested position is less than a limit.

In some cases, the controller 612 may be configured to take an estimated position reset action after a specified number of damper blade moves, and wherein the estimated position reset action includes moving to either the closed end position or the open end position, resetting the estimated position, zeroing a count of moves since a last estimated position reset action, then moving the damper blade to the requested position. The controller 612 may be configured to set a new value for the specified number of damper blade moves, where the new value is a count of moves that is present when the controller 612 determines it has reached a fully open or a fully closed position while attempting to move to a requested position.

The controller 612 may be configured to determine the velocity constant based on driving the damper blade over a full range of motion from a fully open position to fully closed position while integrating the back EMF signals over the driving time. In some cases, when the controller 612 determines that the current position of the damper blade corresponds to the open end position, the controller 612 may reset the estimated current position to the open end position. In some cases, the controller 612 may be configured to determine the estimated current position of the damper blade based at least in part on integrating a plurality of back EMF signals over time periods during which the damper blade is being driven towards desired positions and adding the integrated result multiplied by a velocity constant to the reset estimated position. In some cases, the controller 612 may be configured to receive a requested position and to drive the damper blade to the requested position by driving the damper blade towards the requested position while periodically estimating the position and stopping driving the damper blade when the absolute value of the estimated position minus the requested position is less than a limit.

Figure 24:
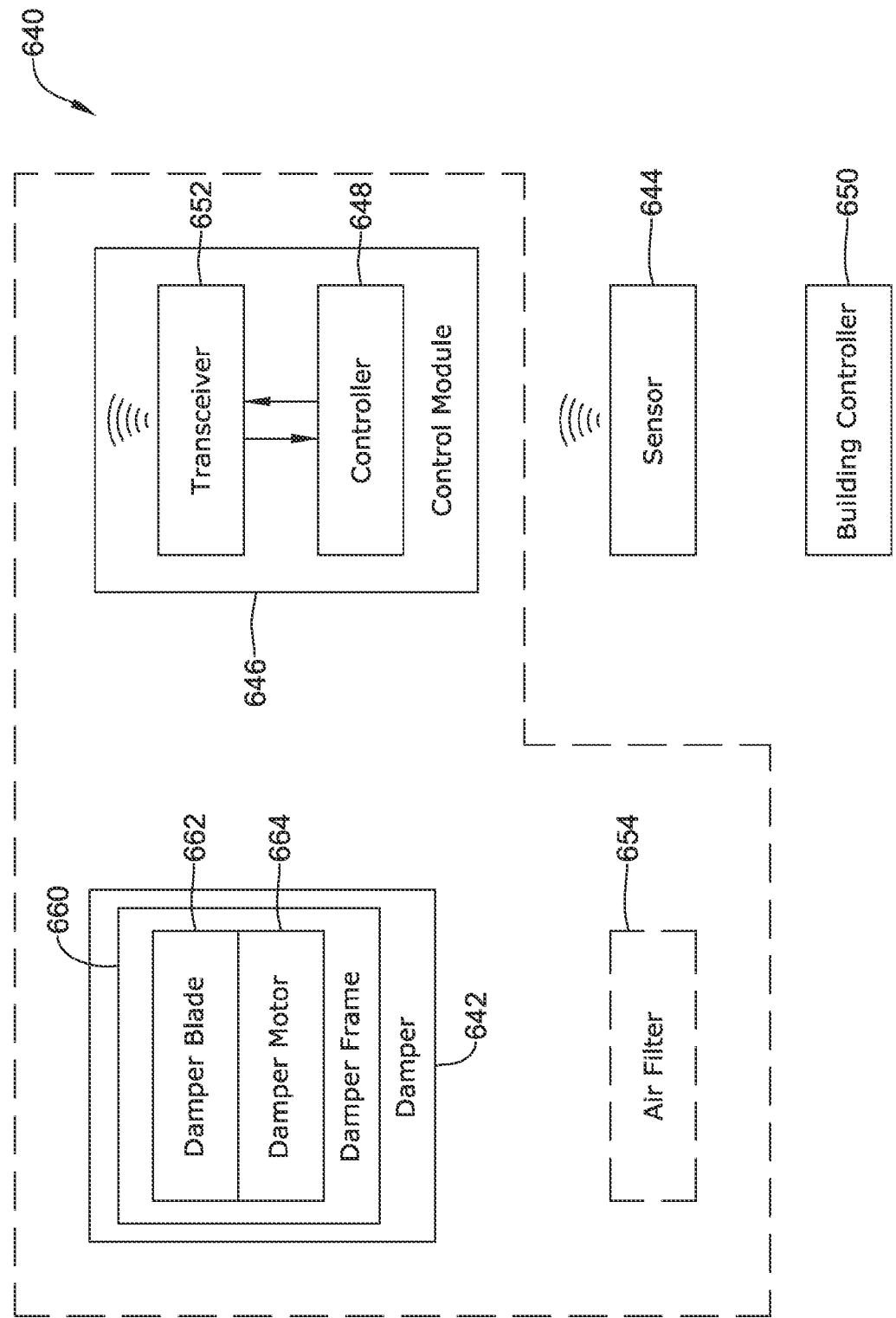
FIG. 24 is a schematic block diagram of an illustrative damper system.

FIG. 24 is a schematic block diagram of an illustrative damper system 640 that is configured for placement within an existing ductwork system that includes a duct that supplies conditioned air through a register boot to a register vent within a room of a building. The illustrative damper system 640 includes a damper 642 that is configured to be secured within the duct 120 of the existing ductwork system upstream of the register boot 122. The damper 642 is rotatable between a closed end position in which air moving through the duct 120 is restricted from flowing past the damper 642 and through the register vent, and an open end position in which air moving through the duct 120 is less restricted from flowing past the damper 642 and through the register vent. The illustrative damper system 640 includes one or more sensors 644 as well as a control module 646 that is operably coupled to the damper 642 and to the one or more sensors 644. While only a single sensor 644 is illustrated, it will be appreciated that two, three or more sensors 644 may be provided. The one or more sensors 644 may include, but are not limited to, one or more of an air quality sensor, a temperature sensor, a humidity sensor and/or an occupancy sensor.

The control module 646 may be configured to be secured within the register boot 122 downstream of the damper 642 and may include a controller 648 that is configured to control operation of the damper 642 and to report one or more sensed conditions to a building controller 650 that is located outside of the existing ductwork system when the one or more sensors 644 sense one or more conditions. In some cases, the control module 646 may also include a wireless transceiver 652 for reporting the one or more sensed conditions to the building controller 650, and in some cases for receiving instructions from the building controller 650. In some cases, at least some of the one or more sensors 644 are located within the control module 646. In some instances, at least some of the one or more sensors 644 are remote from the damper system 640 (e.g. in the living space), and wirelessly communicate with the controller 648 via the wireless transceiver 652. In some cases, the damper system 640 may include an air filter 654 that may be disposed downstream of the damper 642.

In some instances, the building controller 650 may be an HVAC controller for controlling an HVAC system of the building, and may control operation of the HVAC system of the building. In some cases, the controller 648 of the control module 646 may be configured to transmit to the HVAC controller a request for a change in operation of the HVAC system based at least in part upon information received by the controller 648 from the one or more sensors 644. A change in operation of the HVAC system may, for example, include one or more of a request to activate one or more of a heater, an air conditioner, a fan, a humidifier, and a ventilator of the HVAC system.

In some cases, if the one or more sensors 644 includes an air quality sensor, the controller 648 may be configured to report an air quality problem to the building controller 650 when the air quality sensor senses that the sensed air quality has crossed an air quality threshold. In some instances, the one or more sensors 644 may instead be in communication directly with the building controller 650, and the building controller 650 may determine that the sensed air quality has crossed an air quality threshold. If the one or more sensors 644 includes a humidity sensor, the controller 648 may be configured to report a humidity condition to the building controller 650 when the humidity sensor senses that the sensed humidity has crossed a humidity threshold. In some instances, the one or more sensors 644 may instead be in communication directly with the building controller 650, and the building controller 650 may determine that the humidity has crossed a humidity threshold.

If the one or more sensors 644 includes an occupancy sensor, the controller 648 may be configured to report an occupied condition to the building controller 650 when the occupancy sensor senses occupancy. If the one or more sensors 644 includes an air flow sensor, the controller 648 may be configured to report an air flow condition to the building controller 650 when the air flow sensor senses that the sensed air flow has crossed an air flow threshold. If the one or more sensors 644 includes a temperature sensor, the controller 648 may be configured to report a temperature condition to the building controller 650 when the temperature sensor senses that the sensed temperature has crossed a temperature threshold. In some cases, the building controller 650 may activate the appropriate building system to address the condition(s) indicated by the controller 648. In some cases, as noted, the one or more sensors 644 may instead report directly to the building controller 650, which may then decide to take appropriate action.

When the one or more sensors 644 includes an occupancy sensor, the controller 648 of the control module 646 may be configured to operate the damper 642 in accordance with a first control algorithm when the room is indicated to be occupied and may operate the damper 642 in accordance with a second control algorithm when the room is not indicated as being occupied. For example, when the room is occupied, the damper 642 may be controlled such that the controlled parameter(s) (e.g. temperature) are controlled within a tighter range (e.g. smaller dead band) than when the room is un-occupied. The dead band refers to an allowable temperature swing between an actual temperature and a temperature setpoint. When the room is occupied, the temperature is not allowed to vary as much, for example.

In some cases, the damper 642 includes a damper frame 660 and a damper blade 662 that is rotatably securable relative to the damper frame 660 and is rotatable between a closed end position in which air moving through the existing ductwork is restricted from flowing past the damper blade 662 and through the register vent, and an open end position in which air moving through the existing ductwork is less restricted from flowing past the damper blade 662 and through the register vent. A damper motor 664 is operably coupled to the damper frame 660 and the damper blade 662, and is configured to rotate the damper blade 662 relative to the damper frame 660 between the closed end position and the open end position.

Figure 25:
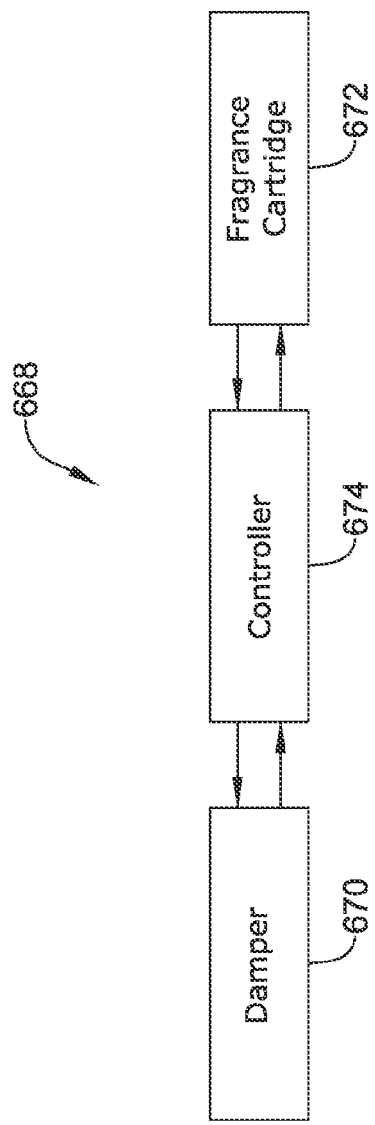
FIG. 25 is a schematic block diagram of an illustrative room comfort assembly.

FIG. 25 is a schematic block diagram illustrating a room comfort assembly 668 that is configured for placement within an existing ductwork system that includes a duct that supplies conditioned air through a register boot to a register vent within a room. The room comfort assembly 668 includes a damper 670 that is configured to be positioned upstream of the register vent and that is rotatable between a closed end position in which air moving through a duct 120 is restricted from flowing past the damper 670 and through the register vent, and an open end position in which air moving through the duct 120 is less restricted from flowing past the damper 670 and through the register vent. A replaceable fragrance cartridge 672 is configured to be positioned upstream of the register vent for selectively releasing a fragrance. A controller 674 is configured to be positioned upstream of the register vent and operatively coupled to the damper 670 and the fragrance cartridge 672.

The controller 674 may be configured to control operation of the damper 670 and to selectively activate the release of fragrance from the fragrance cartridge 672.

Figure 26:
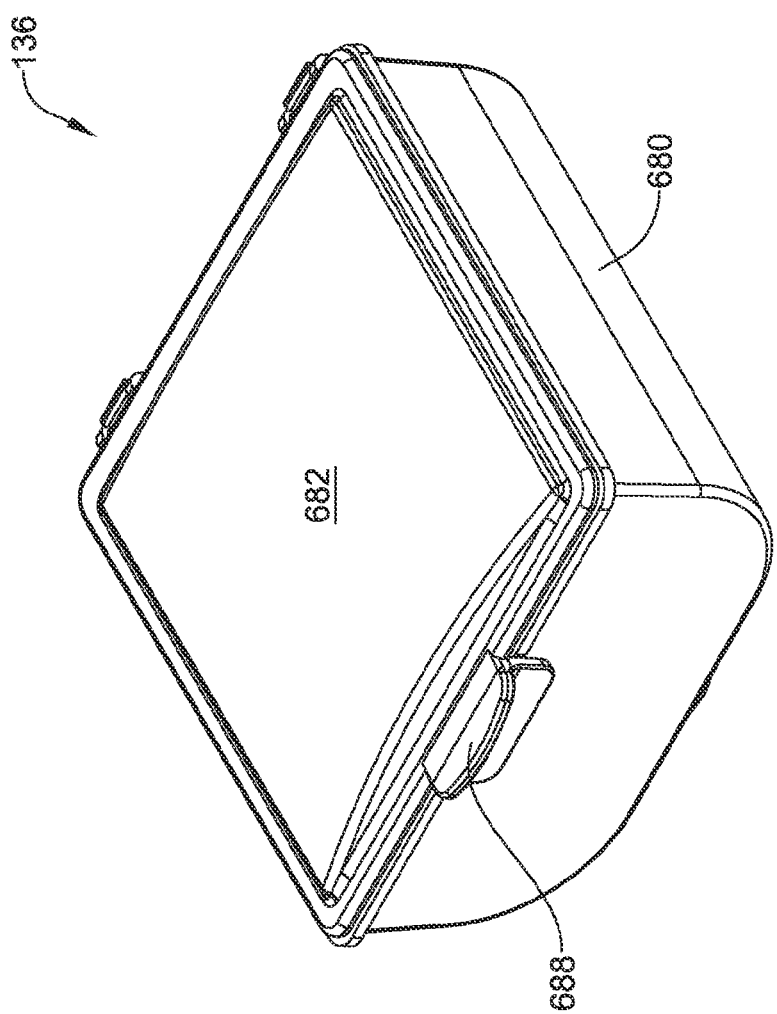
FIG. 26 is a perspective view of an illustrative power module.
Figure 27:
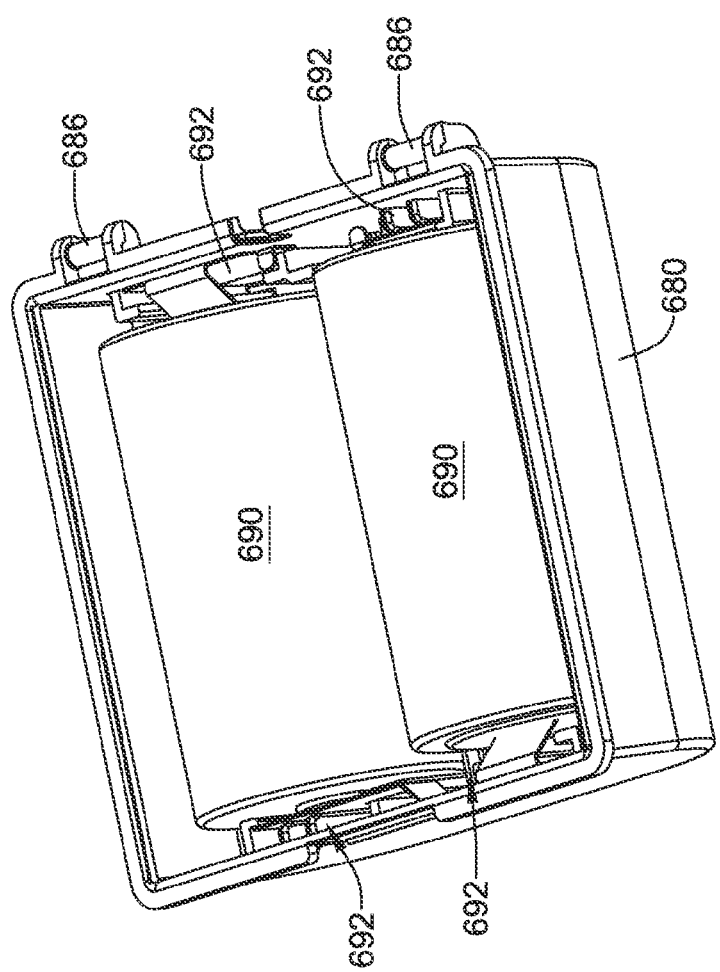
FIG. 27 is a perspective view of the illustrative power module of FIG. 26 with a hinged top removed.
Figure 28:
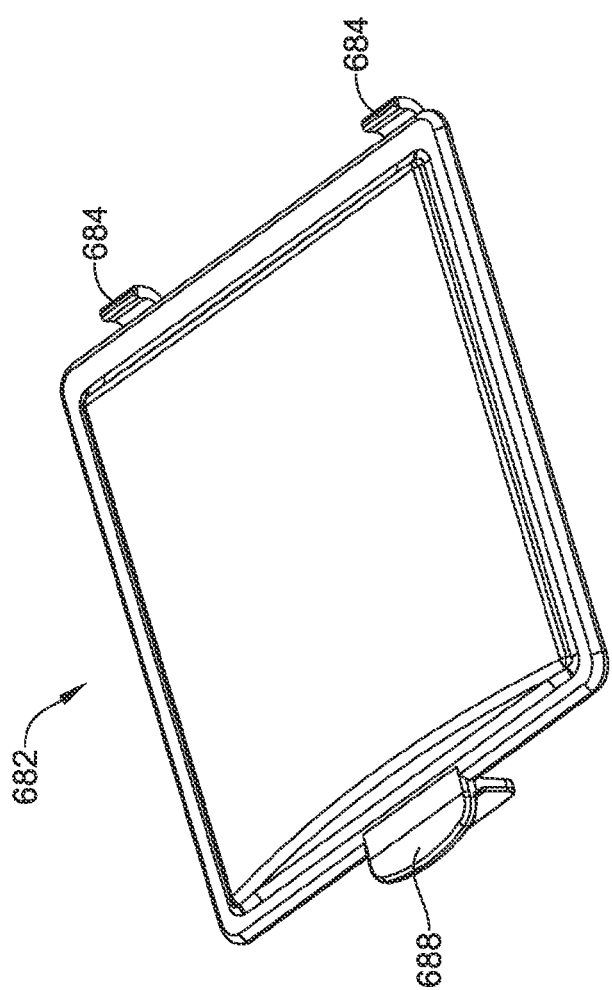
FIG. 28 is a perspective view of the hinged top of the illustrative power module of FIG. 26.

FIG. 26 is a perspective view of the power module 136. The illustrative power module 136 has a housing 680 and a hinged top 682. FIG. 27 shows the power module 136 with the hinged top 682 removed, and FIG. 28 shows the hinged top 682. The hinged top 682 may include first hinge sections 684 that hingedly interact with second hinge sections 686 that are disposed on the housing 680. Together, the first hinge sections 684 and the second hinge sections 686 cooperate to hingedly couple the hinged top 682 to the housing 680. The hinged top 682 also includes a latch 688 that releasably secures the hinged top 682 to the housing 680. With the hinged top 682 removed, as shown in FIG. 27, it can be seen that the illustrative power module 136 accommodates one or more batteries 690 (two are shown) within the housing 680, as well as the necessary electrical couplings 692. By mounting the power module 136 at a location accessible by a homeowner, such as within the register boot 122, it will be appreciated that a homeowner will be able to easily access the power module 136 in order to change batteries when necessary. In some cases, the power module 136 may be magnetically coupled to the register boot 122. Alternatively, the power module 136 may be screwed or otherwise secured to the register boot 122.

Figure 29:
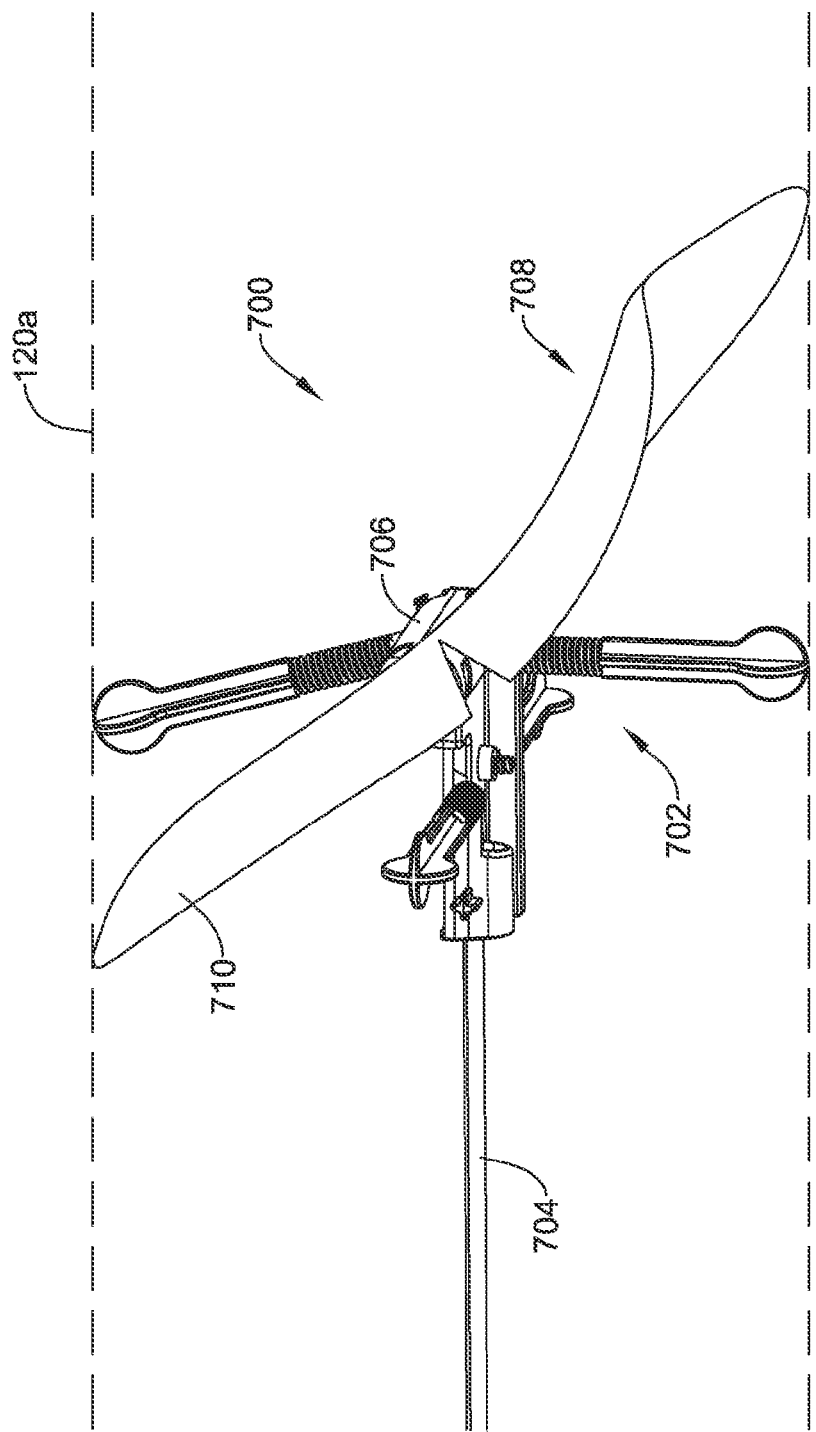
FIG. 29 is a side view of an illustrative damper assembly having a single damper blade, the damper assembly shown disposed within a clear duct.
Figure 30:
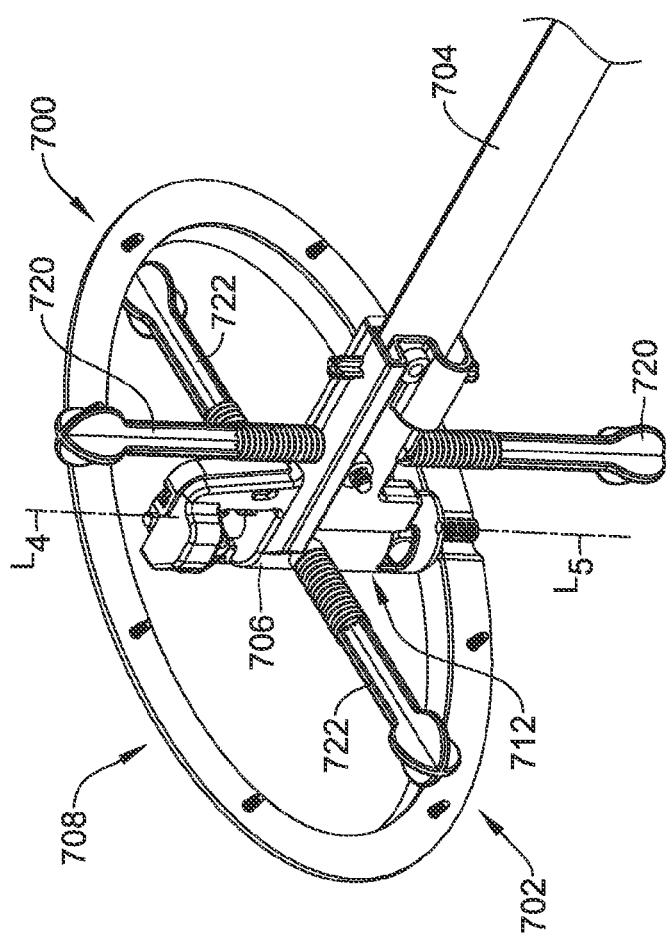
FIG. 30 is a perspective view of the illustrative damper assembly of FIG. 29, shown without the flexible polymeric portion of the blade.

FIG. 29 is a side view of another illustrative damper assembly 700 shown deployed within a clear duct 120*a*, and FIG. 30 is a perspective view of the illustrative damper assembly 700. In FIG. 30, the flexible polymeric portion of the single blade has been removed to better illustrate other features and elements of the damper assembly 700. The illustrative damper assembly 700 includes a damper 702 that is coupled with an elongated deployment member 704 that may, for example, be similar to the elongated deployment member 132 shown in previous Figures. In some cases, the elongated deployment member 704 is configured to facilitate placement of the damper body 706 in a duct of an existing ductwork system of a building from an installation location outside of the duct, such as within or even exterior to a register boot. In some cases, the elongated deployment member 704 may be configured to be secured to the register boot, and to extend upstream therefrom in order to help hold the damper assembly 702 in position within the duct 120*a*.

The damper assembly 702 includes a damper body 706 and a damper blade 708 that is pivotably secured relative to the damper body 706. The damper blade 708 includes a resilient seal 710 that extends radially outwardly from the damper blade 708. The damper blade 708 is pivotably movable between a first position in which air flow is restricted from flowing past the damper blade 708 (as shown in FIG. 29) and a second position in which air flow is less restricted from flowing past the damper blade 708.

A drive motor 712 is secured relative to the damper body 706, and in some cases may be disposed within the damper body 706. The drive motor 712 may be configured to move the damper blade 708 between the first position and the second position. In some cases, the drive motor 712 has a drive motor axis of rotation L4, and the damper blade 708 has a pivot axis L5 along which the damper blade 708 pivots, and the pivot axis L5 is parallel to the drive motor axis of rotation L4. In some cases, the pivot axis L5 is collinear with the drive motor axis of rotation L4, but this is not required in all cases.

In some cases, the damper assembly 702 includes a first pair of spring-loaded standoffs 720 that extend radially outwardly from the damper body 706. Each of the first pair of spring-loaded standoffs 720 extend orthogonally to the elongated deployment member 704. In some instances, the damper assembly 702 includes a second pair of spring-loaded standoffs 722 that extend radially outwardly from the damper body 706. Each of the second pair of spring-loaded standoffs 722 may extend orthogonally to the elongated deployment member 704 as well as being orthogonal to the first pair of spring-loaded standoffs 720. It will be appreciated that each of the spring-loaded standoffs 720 and 722 may be biased into a position (shown in FIG. 30) in which they extend straight out from the damper body 706, and may deflect (shown in FIG. 29) as they interact with an inner surface of the duct 120*a*. The spring-loaded standoffs 720, 722 may deflect further while the damper assembly 702 is being advanced through the duct work, and may attempt to regain their straight configuration once the damper assembly 702 is in position, thereby anchoring the damper assembly 702 in place, roughly centered within the duct 120*a*.

Figure 31:
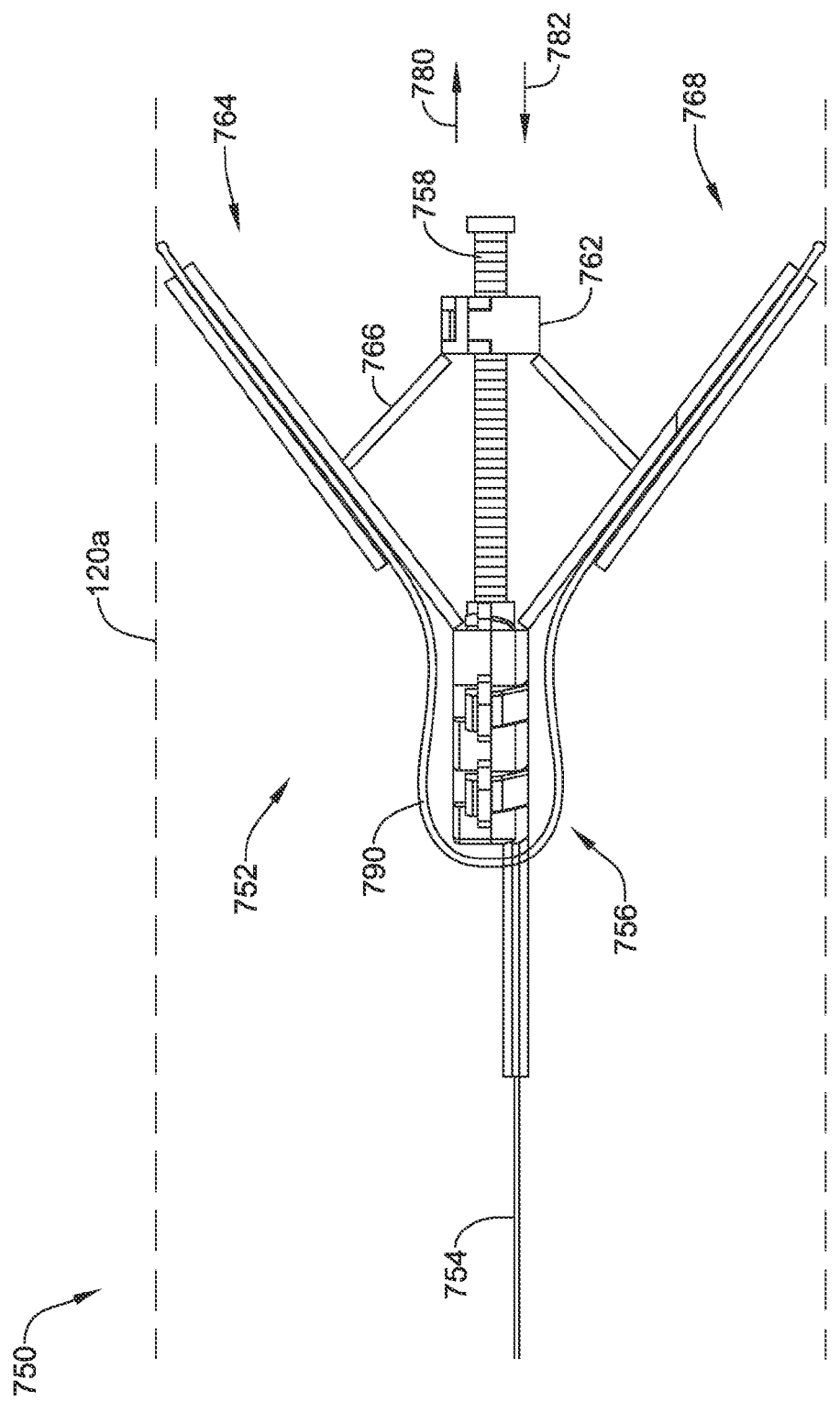
FIG. 31 is a side view of an illustrative damper assembly having two damper blades, the damper assembly shown disposed within a clear duct.
Figure 32:
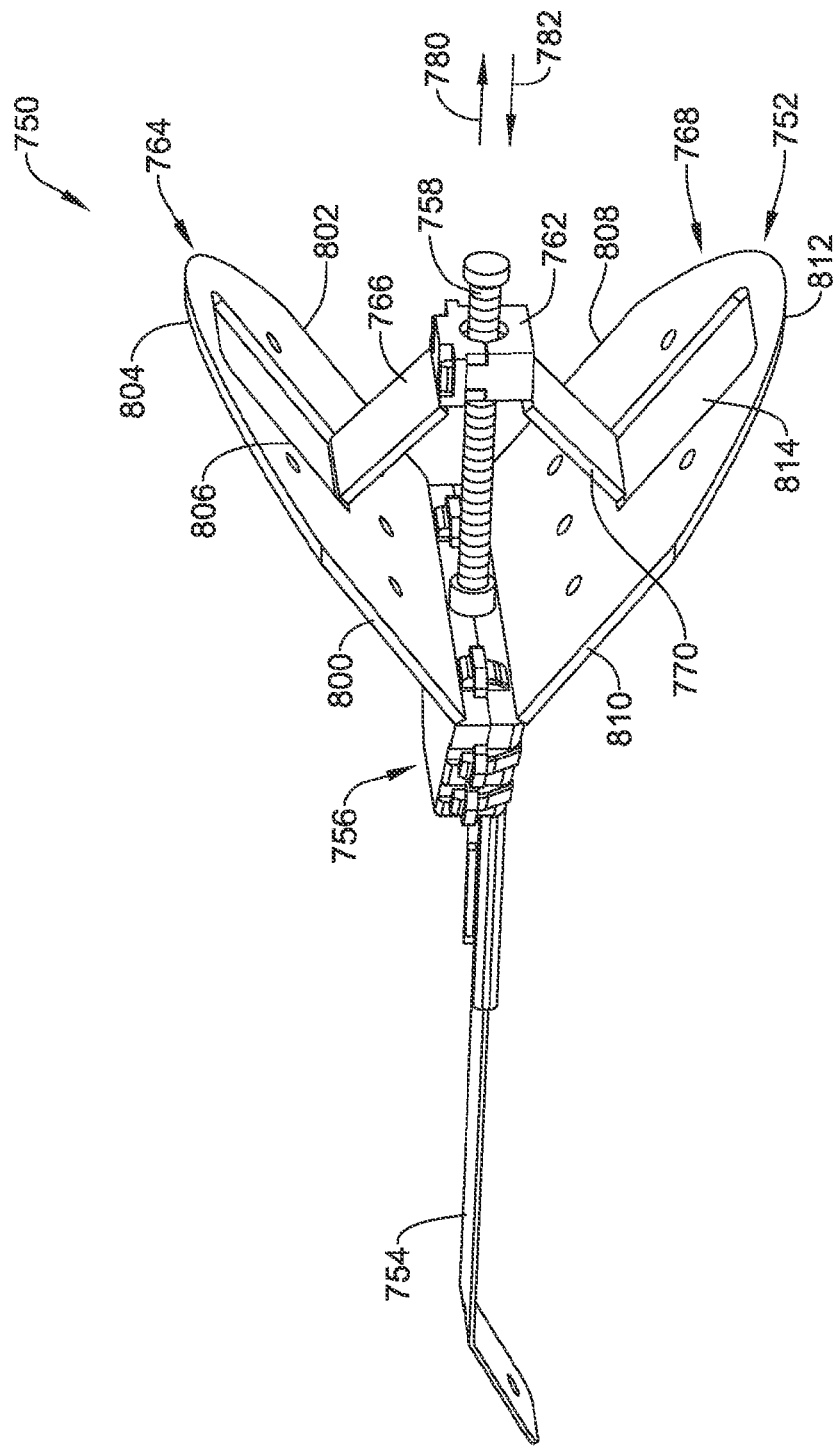
FIG. 32 is a perspective view of the illustrative damper assembly of FIG. 31, shown without the flexible polymeric portions of the blades.
Figure 33:
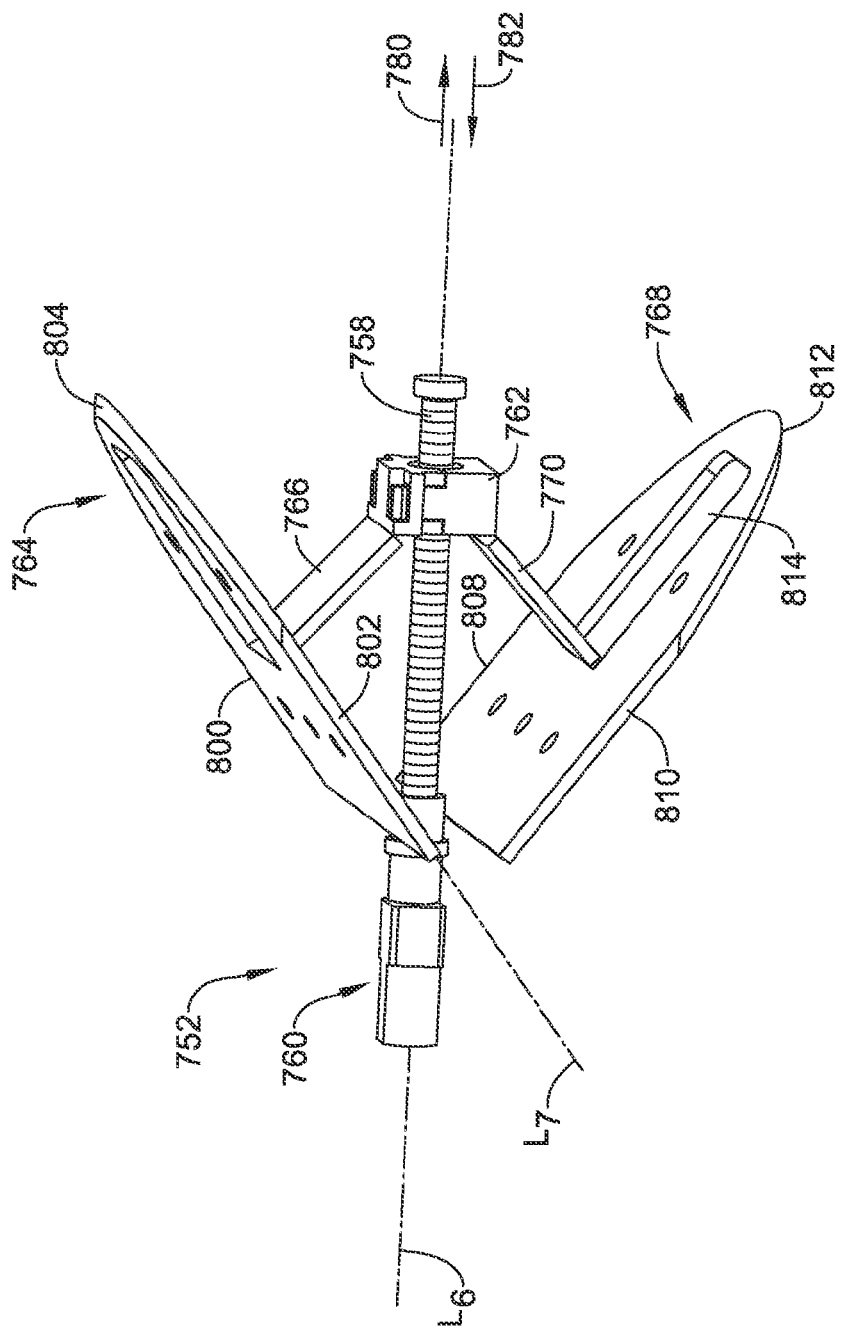
FIG. 33 is a perspective view of a portion of the illustrative damper assembly of FIG. 32.

FIG. 31 a side view of another illustrative damper assembly 750 shown deployed within a clear duct 120*a*. FIG. 32 is a perspective view of the damper assembly 750 in which the flexible polymeric portions of damper blades have been removed to better illustrate other features and elements of the damper assembly 750. FIG. 33 is a perspective view of a portion of the damper assembly 750. The illustrative damper assembly 750 includes a damper assembly 752 that is coupled to an elongated deployment member 754. The damper assembly 750 is configured for placement within an existing ductwork system that includes a duct that supplies conditioned air through a register boot to a register vent within a room of a building. The damper assembly 752 includes a damper body 756 and a threaded rod 758 that extends in an upstream direction from the damper body 756. The threaded rod 758 is operably coupled to a drive motor 760 that is secured to the damper body 756. In some cases, the drive motor 760 is disposed within the damper body 756. The threaded rod 758 is configured to rotate in response to the drive motor 760 being actuated. A nut 762 is threadedly engaged with the threaded rod 758.

The damper assembly 752 includes a first damper blade segment 764 that is pivotably secured to the damper body 756 and extends upstream from the damper body 756. The first damper blade segment 764 includes a first linking segment 766 that extends between the first damper blade segment 764 and the nut 762. The damper assembly 752 includes a second damper blade segment 768 that is pivotably secured to the damper body 756 and extends upstream from the damper body 756. The second damper blade segment 768 includes a second linking segment 770 that extends between the second damper blade segment 768 and the nut 762. It will be appreciated that the first linking segment 766 and the second linking segment 770 constrain the nut 762 against rotation such that rotation of the threaded rod 758 causes the nut 762 to translate along the threaded rod 758, and translation of the nut 762 in a first direction indicated by an arrow 780 causes the first damper blade segment 764 and the second damper blade segment 768 to pivot closer together while translation of the nut 762 in a second direction indicated by an arrow 782 causes the first damper blade segment 764 and the second damper blade segment 768 to pivot farther apart. It will be appreciated that the first damper blade segment 764 and the second damper blade segment 768 move in unison, either both moving away from each other or both moving towards each other. A resilient seal 790 extends radially outwardly from the first damper blade segment 764 and the second damper blade segment 768. The resilient seal 790 has a shape that facilitates the resilient seal 790 sealing against an interior of the duct 120a when the first damper blade segment 764 and the second damper blade segment 768 move away from each other sufficiently far to engage the inner surface of the duct.

In some cases, and as best shown in FIG. 32, the first damper blade segment 764 includes a first side 800 and a second side 802 that is parallel to the first side 800. A curved side 804 extends between the first side 800 and the second side 802. The first damper blade segment 764 may include a first cutout portion 806 that is configured to enable the first linking segment 766 to move at least partially into the first cutout portion 806 when the first damper blade segment 764 moves towards the threaded rod 758 and the nut 762. The first linking segment 766 may be considered as being complementary to the first cutout portion 806.

In some cases, the second damper blade segment 768 includes a first side 808 and a second side 810 that is parallel to the first side 808. A curved side 812 extends between the first side 808 and the second side 810. The second damper blade segment 768 may include a second cutout portion 814 that is configured to enable the second linking segment 770 to move at least partially into the second cutout portion 814 when the second damper blade segment 768 moves towards the threaded rod 758 and the nut 762. The second linking segment 770 may be considered as being complementary to the second cutout portion 814.

In some cases, and as best shown in FIG. 33, the drive motor 760 has a drive motor axis of rotation L6 and the damper blade (collectively the first damper blade segment 764 and the second damper blade segment 768) has a pivot axis L7 along which the damper blade pivots, and the pivot axis L7 is perpendicular to the drive motor axis of rotation L6. Put another way, the first damper blade segment 764 and the second damper blade segment 768 are each pivotally secured at one end thereof to the damper body 756 and pivot relative to a plane extending through the damper body 756 and passing between the first damper blade segment 764 and the second damper blade segment 768.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A control module configured to control operation of a damper assembly, the damper assembly including a damper configured to be disposed within an air duct configured to provide air to a metal register boot, the control module comprising:
 a control module housing configured to be secured to the metal register boot remote from the damper assembly at a position downstream of the damper assembly and upstream of a register vent;
 control circuitry disposed within the control module housing and configured to control operation of the damper assembly,
  wherein the control circuitry is configured to be electrically connected to the metal register boot when the control module housing is secured to the metal register boot;
 an antenna extending from the control module housing and electrically coupled to the control circuitry, at least part of the antenna configured to extend through an opening formed within a wall of the metal register boot to be positioned exterior to the metal register boot; and
 a spring finger operably coupled to the control circuitry and extending outwardly from the control module housing, wherein the spring finger is configured to electrically connect the control circuitry to the metal register boot when the control module housing is secured to the metal register boot.

2. The control module of claim 1, wherein the control module housing has a curved outer surface from which the antenna extends to accommodate a curve in the wall of the metal register boot.

3. The control module of claim 1, wherein the control module housing is configured to accept a power supply cable configured to provide power to operate the control circuitry.

4. The control module of claim 1, wherein the control circuitry is further configured to receive, via the antenna, wireless communication signals from a remote building controller, and to operate the damper based at least in part upon the wireless communication signals received from the remote building controller.

5. The control module of claim 1, further comprising a flexible grommet that extends from the control module housing and is configured to secure the control module housing relative to the opening formed within the wall of the metal register boot, the antenna extending through the flexible grommet.

6. The control module of claim 5, wherein the flexible grommet is configured to seal against air flow around the flexible grommet and through the opening formed within the wall of the metal register boot.

7. The control module of claim 1, further comprising:
 a flexible grommet that is configured to extend through and secure itself to the opening formed within the metal register boot; and
 an anchoring plug coupled to the antenna and configured to engage the flexible grommet to secure the control module relative to the metal register boot.

8. The control module of claim 1, further comprising:
 a circuit board including the control circuitry; and
 a screw configured to extend through the circuit board and into the metal register boot to electrically connect the circuit board to the metal register boot and to secure the control module housing relative to the metal register boot.

9. The control module of claim 1, further comprising a power jack secured relative to the control module housing, wherein the power jack is configured to accept a power cable.

10. The control module of claim 1, further comprising a control wire jack secured relative to the control module housing and configured to accommodate a control cable coupling the control circuitry to the damper assembly.

11. The control module of claim 1, wherein the control module is configured to electrically connect to the metal register boot such that the metal register boot functions as a ground plane for the antenna.

12. The control module of claim 1, further comprising a magnet secured relative to the control module housing in order to magnetically attach the control module housing relative to the wall of the metal register boot.

13. The control module of claim 1, wherein the antenna is sufficiently flexible to be able to bend or deflect in response to encountering an obstacle exterior to the metal register boot.

14. The control module of claim 1, further comprising a resilient seal secured to an outer surface of the control module housing proximate an aperture through which the antenna extends from the control module housing, the resilient seal sealing around the antenna and spacing the control module housing from the metal register boot.

15. A control module configured to control operation of a damper assembly, the damper assembly including an air damper configured to be disposed within an air duct, the control module comprising:
- a control module housing configured to be secured within a metal register boot downstream of the air duct and upstream of a register vent;
- a control jack configured to accommodate a control cable;
- a control circuit board disposed within the control module housing and operably coupled with the control jack, the control circuit board including;
- a transceiver configured to receive instructions communicated from a remote building controller; and
- a processor configured to generate air damper movement commands in response to the received instructions and transmit the air damper movement commands to the damper assembly via the control cable;
- an antenna extending from the control module housing and operably coupled to the transceiver, at least part of the antenna being configured to extend through an opening formed within a wall of the metal register boot to be positioned exterior to the metal register boot; and
- a spring finger operably coupled to the control circuit board and extending outwardly from the control module housing, wherein the spring finger is configured to electrically connect the control circuit board to the metal register boot when the control module housing is secured to the metal register boot.

16. The control module of claim 15, wherein the control module is configured to electrically connect to the metal register boot such that the metal register boot functions as a ground plane for the antenna.

17. The control module of claim 15, further comprising a flexible grommet that extends from the control module housing and is configured to secure the control module housing relative to the opening formed within the wall of the metal register boot, the antenna extending through the flexible grommet, wherein the flexible grommet is configured to seal against air flow around the flexible grommet and through the opening formed within the wall of the metal register boot.

18. The control module of claim 15, further comprising:
- a flexible grommet that is configured to extend through and secure itself to the opening formed within the metal register boot; and
- an anchoring plug coupled to the antenna and configured to engage the flexible grommet to secure the antenna relative to the metal register boot.

* * * * *